(12) United States Patent
Sworen et al.

(10) Patent No.: US 10,246,608 B2
(45) Date of Patent: *Apr. 2, 2019

(54) NON-FLUORINATED URETHANE BASED COATINGS

(71) Applicant: THE CHEMOURS COMPANY FC LLC, Wilmington, DE (US)

(72) Inventors: John Christopher Sworen, Chadds Ford, PA (US); Gerald Oronde Brown, Wilmington, DE (US); Mario Vincenzini, Coatesville, PA (US); Flemming Vang Sparsoe, Skanderborg (DK); Ewa Kohler, West Chester, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,777

(22) Filed: Sep. 24, 2015

(65) Prior Publication Data

US 2016/0090508 A1 Mar. 31, 2016

Related U.S. Application Data

(60) Provisional application No. 62/055,930, filed on Sep. 26, 2014.

(51) Int. Cl.
| | |
|---|---|
| C08G 18/62 | (2006.01) |
| C09D 175/08 | (2006.01) |
| C09D 175/06 | (2006.01) |
| D06M 13/148 | (2006.01) |
| C08G 18/28 | (2006.01) |
| C09D 175/04 | (2006.01) |
| C08G 18/32 | (2006.01) |
| D06M 15/564 | (2006.01) |
| D06M 15/568 | (2006.01) |
| D21H 17/57 | (2006.01) |
| C08G 18/48 | (2006.01) |
| C08G 18/73 | (2006.01) |
| C08G 18/78 | (2006.01) |

(Continued)

(52) U.S. Cl.
CPC ....... C09D 175/08 (2013.01); C08G 18/0814 (2013.01); C08G 18/0828 (2013.01); C08G 18/282 (2013.01); C08G 18/283 (2013.01); C08G 18/284 (2013.01); C08G 18/285 (2013.01); C08G 18/288 (2013.01); C08G 18/2865 (2013.01); C08G 18/3206 (2013.01); C08G 18/3218 (2013.01); C08G 18/3246 (2013.01); C08G 18/4825 (2013.01); C08G 18/6229 (2013.01); C08G 18/73 (2013.01); C08G 18/7831 (2013.01); C08G 18/792 (2013.01); C09D 175/04 (2013.01); C09D 175/06 (2013.01); C14C 9/00 (2013.01); D06M 13/148 (2013.01); D06M 15/564 (2013.01); D06M 15/568 (2013.01); D21H 17/57 (2013.01); D21H 19/26 (2013.01); D21H 21/16 (2013.01); D06M 2101/02 (2013.01); D06M 2101/16 (2013.01); D06M 2200/12 (2013.01)

(58) Field of Classification Search
CPC .. C09D 175/08; C09D 175/06; C09D 175/04; C08G 18/0814; C08G 18/0828; C08G 18/282; C08G 18/283; C08G 18/284; C08G 18/285; C08G 18/2865; C08G 18/288; C08G 18/3206; C08G 18/3218; C08G 18/3246; C08G 18/4825; C08G 18/73; C08G 18/7831; C08G 18/792; C08G 18/6229
See application file for complete search history.

(56) References Cited

U.S. PATENT DOCUMENTS

| | | |
|---|---|---|
| 3,049,513 A | 8/1962 | Damusis |
| 3,505,001 A | 4/1970 | Wagner |

(Continued)

FOREIGN PATENT DOCUMENTS

| | | |
|---|---|---|
| CN | 101914185 A | 12/2010 |
| EP | 2415879 | 8/2010 |

(Continued)

OTHER PUBLICATIONS

International Search Report and Written Opinion, PCT/US2015/051872, dated Dec. 14, 2015.
Mao et al., Effect of additives on microstructure and properties of polyurethane coating film for fabrics, Fangzhi Xuebao (1996), 17(2), 4-7 (Abstract attached).
International Search Report and Written Opinion, PCT/US2014/032095, dated Sep. 9, 2014.

*Primary Examiner* — Michael L Leonard

(57) ABSTRACT

The present invention is an aqueous composition comprising at least one hydrophobic compound having at least one linkage of Formula I:

—NHC(O)—X—    (I)

wherein X is the residue of a cyclic or acyclic sugar alcohol which is substituted with at least one —$R^1$; —C(O)$R^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, a linear or branched alkyl group having 6 to 30 carbons optionally comprising at least 1 unsaturated bond, or mixtures thereof.

18 Claims, No Drawings

(51) Int. Cl.
- *C08G 18/79* (2006.01)
- *C08G 18/08* (2006.01)
- *C14C 9/00* (2006.01)
- *D21H 19/26* (2006.01)
- *D21H 21/16* (2006.01)
- *D06M 101/02* (2006.01)
- *D06M 101/16* (2006.01)

(56) References Cited

U.S. PATENT DOCUMENTS

| | | |
|---|---|---|
| 4,304,683 A | 12/1981 | Morinaka et al. |
| 4,360,447 A | 11/1982 | Morinaka et al. |
| 4,388,372 A | 6/1983 | Champaneria et al. |
| 5,041,467 A * | 8/1991 | Kataoka ............ C08G 18/0804 521/159 |
| 6,864,312 B2 * | 3/2005 | Moore ............... C08G 18/0828 524/591 |
| 7,344,758 B2 | 3/2008 | Franchina et al. |
| 8,349,986 B2 | 1/2013 | Rukavina et al. |
| 8,586,697 B2 | 11/2013 | Elizalde et al. |
| 2003/0120101 A1 | 6/2003 | Lai |
| 2005/0085573 A1 | 4/2005 | Sandner et al. |
| 2006/0052556 A1 | 3/2006 | Franchina et al. |
| 2006/0151739 A1 | 7/2006 | Sandner et al. |
| 2007/0009663 A1 | 1/2007 | Wang et al. |
| 2007/0167601 A1 | 7/2007 | Rukavina et al. |
| 2008/0146750 A1 | 6/2008 | Corn et al. |
| 2010/0124649 A1 | 5/2010 | Rukavina et al. |
| 2010/0190397 A1 | 7/2010 | Duschek et al. |
| 2013/0288066 A1 | 10/2013 | Reiners et al. |
| 2014/0031483 A1 | 1/2014 | Elizalde et al. |
| 2014/0295724 A1 | 10/2014 | Sworen et al. |
| 2016/0090392 A1 | 3/2016 | Sworen et al. |
| 2016/0090438 A1 | 3/2016 | Sworen et al. |
| 2016/0090508 A1 | 3/2016 | Sworen et al. |
| 2016/0090686 A1 | 3/2016 | Sworen et al. |
| 2016/0090688 A1 | 3/2016 | Sworen et al. |

FOREIGN PATENT DOCUMENTS

| | | |
|---|---|---|
| GB | 887387 | 1/1962 |
| GB | 1360007 | 7/1974 |
| JP | 1972003477 B | 1/1972 |
| JP | 1973004940 | 1/1973 |
| JP | 1983079008 | 5/1983 |
| JP | 1985045678 B2 | 10/1985 |
| JP | 05331130 A | 12/1993 |
| KR | 2009002894 A1 | 1/2009 |
| WO | 200037525 A1 | 6/2000 |
| WO | 2003089477 A1 | 10/2003 |
| WO | 2006024669 A1 | 3/2006 |
| WO | 200640333 A1 | 4/2006 |
| WO | 2009015136 A1 | 1/2009 |
| WO | 2011124710 A | 10/2011 |
| WO | 2014160905 A1 | 10/2014 |
| WO | 2014160906 A2 | 10/2014 |
| WO | 2014160906 A3 | 10/2014 |

* cited by examiner

NON-FLUORINATED URETHANE BASED COATINGS

FIELD OF INVENTION

This invention relates to an aqueous composition comprising a hydrophobic organic urethane compound useful for imparting durable water repellency and optionally stain release to textiles, the compound derived from sugar alcohols.

BACKGROUND OF THE INVENTION

Various compositions are known to be useful as treating agents to provide water repellency and optionally stain release to textile substrates. Many such treating agents are fluorinated polymers and copolymers, or non-fluorinated polymers and copolymers. Non-fluorinated compounds are predominately polyacrylate-based or urethane-based copolymers.

Fluorinated copolymers provide good repellency to water and oil. Various attempts have been made to produce a non-fluorinated water repellent. Non-fluorinated copolymers are known to provide water repellency and optionally stain release to textiles, but are less effective than the fluorinated counterparts.

Moore, in U.S. Pat. No. 6,864,312, discloses a polyurethane polymer that provides moisture resistance. Moore claims polyurethane polymer particle dispersions, where the polyurethane polymers are isocyanate-terminated prepolymers prepared from a formulation including a polyisocyanate and a polyol.

SUMMARY OF INVENTION

The need exists for non-fluorinated compositions that provide water repellency and optionally stain release for textiles, with performance results comparable to fluorinated treating agents. Also desirable is a non-fluorinated composition that can be bio-based derived. The present invention meets these needs.

The present invention comprises aqueous non-fluorinated organic urethane compositions useful for imparting durable water repellency and optionally stain release to textiles, the copolymer derived from isocyanates and sugar alcohols. These non-fluorinated urethanes provide increased durable water repellency and optionally stain release to textiles and are comparable to several fluorinated water repellent compounds.

The present invention is an aqueous composition comprising at least one hydrophobic compound having at least one linkage of Formula I:

(I)

wherein
X is the residue of a cyclic or acyclic sugar alcohol which is substituted with at least one —$R^1$; —$C(O)R^1$; —$(CH_2CH_2O)_n(CH(CH_3)CH_2O)_mR^2$; —$(CH_2CH_2O)_n(CH(CH_3)CH_2O)_mC(O)R^1$; or mixtures thereof;
where the cyclic or acyclic sugar alcohol is selected from a saccharide, reduced sugar, aminosaccharide, aldonic acid, or aldonic acid lactone;
wherein each n is independently 0 to 20;
each m is independently 0 to 20;
m+n is greater than 0;

each $R^1$ is independently a linear or branched alkyl group having 5 to 29 carbons optionally comprising at least 1 unsaturated bond;
each $R^2$ is independently —H, a linear or branched alkyl group having 6 to 30 carbons optionally comprising at least 1 unsaturated bond,
or mixtures thereof.

In a second embodiment, the present invention is a method of preparing an aqueous composition comprising:
(i) reacting (b') at least one sugar alcohol with (b") at least one fatty acid or alkoxylated fatty acid, and
(ii) subsequently reacting the product of step (i) with (a) at least one isocyanate group-containing compound selected from isocyanate, diisocyanate, polyisocyanate, or mixture thereof;
(iii) contacting the reagents or final product of step (ii) with a water carrier;
wherein the (b') at least one sugar alcohol is selected from a saccharide, reduced sugar, aminosaccharide, aldonic acid, or aldonic acid lactone.

In a third embodiment, the present invention is a method of treating a fibrous substrate comprising applying to the surface of the substrate an aqueous composition comprising at least one hydrophobic compound having at least one linkage of Formula I as defined above.

DETAILED DESCRIPTION OF INVENTION

Herein all trademarks are designated with capital letters.

The present invention provides an aqueous composition for imparting water repellency and optionally stain release to fibrous substrates. The resulting compounds provide enhanced performance and durability of water repellency to treated substrates compared to traditional non-fluorinated commercially available treatment agents. The starting materials of the present invention can be derived from bio-sourced materials.

The present invention is an aqueous composition comprising at least one hydrophobic compound having at least one linkage of Formula I:

(I)

wherein X is the residue of a cyclic or acyclic sugar alcohol which is substituted with at least one —$R^1$; —$C(O)R^1$; —$(CH_2CH_2O)_n(CH(CH_3)CH_2O)_mR^2$; —$(CH_2CH_2O)_n(CH(CH_3)CH_2O)_mC(O)R^1$; or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, a linear or branched alkyl group having 6 to 30 carbons optionally comprising at least 1 unsaturated bond, or mixtures thereof. The term "residue of a cyclic or acyclic sugar alcohol" is herein defined as the molecular structure of a cyclic or acyclic sugar alcohol when one or more H atoms has been removed from a hydroxyl group —OH. In Formula (I), the bond of X to —NHC(O)— forms a urethane functional group. The urethane functional group may be formed by any suitable method, including by reacting an isocyanate, diisocyanate, or polyisocyanate with a cyclic or acyclic sugar alcohol which is substituted with at least one —$R^1$; —$C(O)R^1$; —$(CH_2CH_2O)_n(CH(CH_3)CH_2O)_mR^2$; —$(CH_2CH_2O)_n(CH(CH_3)CHO)_mC(O)R^1$; or mixtures thereof.

The cyclic or acyclic sugar alcohol is selected from a saccharide, reduced sugar, aminosaccharide, aldonic acid, or aldonic acid lactone, and is substituted with at least one —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof. Such a substitution lends hydrophobic character to the monomer, and to the polymer molecules. In one embodiment, the cyclic or acyclic sugar alcohol is substituted with at least two —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof; and in another embodiment, it is substituted with at least three —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof. Examples of such sugar alcohols (b') include but are not limited to aldoses and ketoses such as those compounds derived from tetroses, pentoses, hexoses, and heptoses. Specific examples include glucose, glyceraldehyde, erythrose, arabinose, ribose, arabinose, allose, altrose, mannose, xylose, lyxose, gulose, galactose, talose, fructose, ribulose, mannoheptulose, sedohelptulose, threose, erythritol, threitol, glucopyranose, mannopyranose, talopyranose, allopyranose, altropyranose, idopyranose, gulopyranose, glucitol, mannitol, erythritol, sorbitol, arabitol, xylitol, ribitol, galactitol, fucitol, iditol, inositol, pentaerythritol, dipentaerythritol, volemitol, gluconic acid, glyceric acid, xylonic acid, galactaric acid, ascorbic acid, citric acid, gluconic acid lactone, glyceric acid lactone, xylonic acid lactone, glucosamine, galactosamine, or mixtures thereof.

The cyclic or acyclic sugar alcohols are substituted with at least one —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$ by any suitable method, including esterification with a fatty acid, to form hydroxy-functional substituted sugar alcohols. In one embodiment, the fatty acid substitution of the cyclic or acyclic sugar alcohols has a melting point of at least −59° C. In another embodiment, the fatty acid substitution of the cyclic or acyclic sugar alcohols has a melting point of at least 0° C., and in a third embodiment, the fatty acid substitution of the cyclic or acyclic sugar alcohols has a melting point of at least 40° C. Suitable fatty acids (b") include, but are not limited to, caprylic acid, capric acid, lauric acid, mysteric acid, palmitic acid, stearic acid, arachidic acid, behenic acid, lignoceric acid, palmitoleic acid, lineolic acid, oleic acid, erucic acid, and mixtures thereof. In one embodiment, R$^1$ is a linear or branched alkyl group having 11 to 29 carbons, and in another embodiment, R$^1$ is a linear or branched alkyl group having 17 to 21 carbons. In one embodiment, R$^2$ is a linear or branched alkyl group having 12 to 30 carbons, in another embodiment, R$^2$ is a linear or branched alkyl group having 18 to 30 carbons, and in another embodiment, R$^2$ is a linear or branched alkyl group having 18 to 22 carbons.

In one embodiment, X is selected from Formulas (IIa), (IIb), or (IIc):

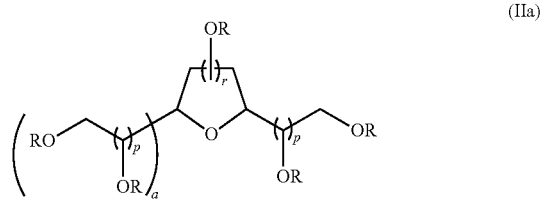
(IIa)

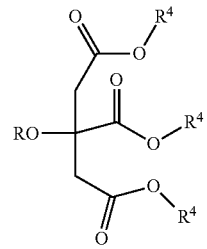
(IIb)

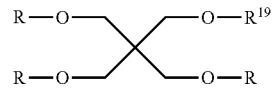
(IIc)

wherein each R is independently a direct bond to NHC(O) of Formula I; —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; each n is independently 0 to 20; each m is independently 0 to 20; m+n is greater than 0; r is 1 to 3; a is 0 or 1; p is independently 0 to 2; provided that a is 0 when r is 3; each R$^1$ is independently a linear or branched alkyl group having 5 to 29 carbons optionally comprising at least 1 unsaturated bond; each R$^2$ is independently —H, or a linear or branched alkyl group having 6 to 30 carbons optionally comprising at least 1 unsaturated bond; or a mixtures thereof, provided when the compound is Formula (IIa), then at least one R is a direct bond to NHC(O) of Formula 1; and at least one R is a —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; each R$^4$ is independently a direct bond to NHC(O) of Formula I; —H, a linear or branched alkyl group having 6 to 30 carbons optionally comprising at least 1 unsaturated bond, or combinations thereof; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; provided when the compound is Formula (IIb), then at least one R or R$^4$ is a direct bond to NHC(O) of Formula 1; and at least one R or R$^4$ is a linear or branched alkyl group optionally comprising at least 1 unsaturated bond, or combinations thereof; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; and each R$^{19}$ is a direct bond to NHC(O) of Formula I; —H, —C(O)R$^1$, or —CH$_2$C[CH$_2$OR]$_3$, provided when the compound is Formula (IIc), then at least one R$^{19}$ or R is a direct bond to NHC(O) of Formula I; and at least one R$^{19}$ or R is —C(O)R$^1$, or —CH$_2$C[CH$_2$OR]$_3$.

In Formulas (IIa), (IIb), or (IIc), the —(CH$_2$CH$_2$O)— represents oxyethylene groups (EO) and —(CH(CH$_3$)CH$_2$O)— represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example.

Where X is Formula (IIa), any suitable substituted reduced sugar alcohol may be employed, including esters of 1,4-sorbitan, esters of 2,5-sorbitan, and esters of 3,6-sorbitan. In one embodiment, X is selected from Formula (IIa) to be Formula (IIa'):

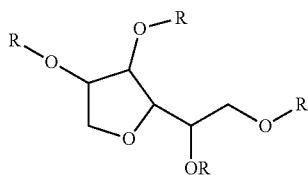

(IIa')

wherein R is further limited to independently a direct bond to NHC(O) of Formula (I), —H; —$R^1$; or —C(O)$R^1$. In one embodiment, at least one R is —C(O)$R^1$ or $R^1$. Compounds used to form residues of Formula (IIa'), having at least one of R is —H and at least one R is selected from —C(O)$R^1$, are commonly known as alkyl sorbitans. These sorbitans can be mono-substituted, di-substituted, or tri-substituted with —C(O)$R^1$. It is known that commercially available sorbitans, such as SPAN, contain a mixture of the various sorbitans ranging from where each R is H (un-substituted), and sorbitans where each R is —C(O)$R^1$ (fully substituted); wherein $R^1$ is a linear or branched alkyl group having 5 to 29 carbons; and mixtures of various substitutions thereof. The commercially available sorbitans may also include amounts of sorbitol, isosorbide, or other intermediates or byproducts.

In one embodiment, at least one R is —C(O)$R^1$, and $R^1$ is a linear branched alkyl group having 5 to 29 carbons. In another embodiment, $R^1$ is a linear or branched alkyl group having 7 to 21 carbons, and in a third embodiment, $R^1$ is a linear or branched alkyl group having 11 to 21 carbons. Preferred compounds used to form these residues include mono-, di-, and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds used to form X include mono-, di-, and tri-substituted sorbitan stearates or sorbitan behenins.

Optionally, $R^1$ is a linear or branched alkyl group having 5 to 29 carbons comprising at least 1 unsaturated bond. Examples of compounds used to form residues of Formula (IIa') wherein at least one R is selected from —C(O)$R^1$; and $R^1$ contains least 1 unsaturated bond, include, but are not limited to, sorbitan trioleate (i.e., wherein $R^1$ is —$C_7H_{14}CH=CHC_8H_{17}$). Other examples include but are not limited to mono-, di-, and tri-substituted sorbitans derived from palmitoleic acid, lineolic acid, arachidonic acid, and erucic acid.

In one embodiment, X of Formula (IIa') is employed, wherein R is further limited to independently a direct bond to NHC(O) of Formula (I) —H; —$(CH_2CH_2O)_n(CH(CH_3)CH_2O)_mR^2$; or —$(CH_2CH_2O)_n(CH(CH_3)CH_2O)_mC(O)R^1$. In this embodiment, at least one R is independently —$(CH_2CH_2O)_n(CH(CH_3)CH_2O)_mR^2$ or —$(CH_2CH_2O)_n(CH(CH_3)CH_2O)_mC(O)R^1$. Compounds forming X of Formula (IIa'), wherein at least one R is —$(CH_2CH_2O)_n(CH(CH_3)CH_2O)_mR^2$ or —$(CH_2CH_2O)_n(CH(CH_3)CH_2O)_mC(O)R^1$, wherein each m is independently 0 to 20, each n is independently 0 to 20, and n+m is greater than 0 are known as polysorbates and are commercially available under the tradename TWEEN. These polysorbates can be mono-substituted, di-substituted, or tri-substituted with alkyl groups $R^1$ or $R^2$. It is known that commercially available polysorbates, contain a mixture of the various polysorbates ranging from where each $R^2$ is H (unsubsituted), and polysorbates where each $R^1$ is a linear or branched alkyl group having 5 to 29 carbons (fully substituted); and mixtures of various substitutions thereof. Examples of compounds used to form X of Formula (IIa') include polysorbates such as polysorbate tristearate, and polysorbate monostearate. Examples of compounds used to form X of Formula (IIa') wherein m+n is greater than 0, and wherein $R^1$ comprises at least 1 unsaturated bond, include but are not limited to, polysorbate trioleate (wherein $R^1$ is $C_7H_{14}CH=CHC_8H_{17}$), are sold commercially under the name Polysorbate 80. Reagents may include mixtures of compounds having various values for R, $R^1$, and $R^2$, and may also include mixtures of compounds where $R^1$ comprises at least one unsaturated bond with compounds where $R^1$ is fully saturated. In one aspect, $R^2$ is H and m is a positive integer.

In one embodiment, X is selected from Formula (IIb). Compounds used to form X of Formula (IIb) are known as alkyl citrates. These citrates can be present as a mono-substituted, di-substituted, or tri-substituted compound with alkyl groups. It is known that commercially available citrates contain a mixture of the various citrates as well as citric acids from where R and each $R^4$ is —H, ranging to citrates where each $R^4$ is a linear or branched alkyl group having 6 to 30 carbons optionally comprising at least 1 unsaturated bond; and mixtures of various substitutions thereof. Mixtures of citrates having various values for $R^1$, $R^2$, and $R^4$ may be used, and may also include mixtures of compounds where $R^1$ comprises at least one unsaturated bond with compounds where $R^1$ is fully saturated. Alkyl citrates are also commercially available wherein m+n is greater than 0, $R^4$ is —$(CH_2CH_2O)_n(CH(CH_3)CH_2O)_mR^2$; or —$(CH_2CH_2O)_n(CH(CH_3)CH_2O)_mC(O)R^1$ and are present in the various substitutions from wherein R and each $R^2$ is H to wherein each $R^1$ and/or $R^2$ is a linear or branched alkyl group having 5 to 30 carbons optionally comprising at least 1 unsaturated bond. Examples of compounds used to form X of Formula (IIb) include, but are not limited to, trialkyl citrates.

In one embodiment, X is selected from Formula (IIc). Compounds used to form X of Formula (IIc) are known as pentaerythriol esters. These pentaerythriol esters can be present as a mono-substituted, di-substituted, or tri-substituted with alkyl groups. Preferred compounds used to form X of Formula (IIc) are dipentaerythriol esters, where $R^{19}$ is —$CH_2C[CH_2OR]_3$. It is known that commercially available pentaerythriol esters contain a mixture of the various pentaerythriol esters where $R^{19}$ and each R is —H, ranging to pentaerythriol esters where each R is —C(O)$R^1$, and $R^1$ is a linear or branched alkyl group having 5 to 29 carbons optionally comprising at least 1 unsaturated bond; and mixtures of various substitutions thereof. The pentaerythriol esters also may contain compounds with mixtures of different chain lengths for R, or mixtures of compounds where $R^1$ comprises at least one unsaturated bond with compounds where $R^1$ is fully saturated.

Residue X of Formulas (IIa), (IIb), and (IIc) can all be bio-based derived. By "bio-based derived", it is meant that at least 10% of the material can be produced from non-crude oil sources, such as plants, other vegetation, and tallow. In one embodiment, X is from about 10% to 100% bio-based derived. In one embodiment, X is from about 35% to 100% bio-based derived. In another embodiment, X is from about 50% to 100% bio-based derived. In one embodiment, X is from about 75% to 100% bio-based derived. In one embodiment, X is 100% bio-based derived. The average OH value of the substituted sugar alcohol compounds used to form X can range from just greater than 0 to about 230. In one embodiment, the average OH value is from about 10 to about 175, and in another embodiment, the average OH value is from about 25 to about 140.

In one embodiment, the hydrophobic compound further comprises at least one moiety Q to form Formula (I'):

-Q-NHC(O)—X— (I')

where Q is a monovalent, divalent, or polyvalent moiety selected from linear or branched, cyclic or acyclic, alkylene groups optionally containing at least one group selected from alkoxy, phenyl, siloxane, urethane, urea, biuret, uretdione, cyclized isocyanate, allophanate, or isocyanurate. Moiety Q can be formed from an isocyanate, diisocyanate, or polyisocyanate compound. In one embodiment, Q is the residue of an isocyanate, diisocyanate, or polyisocyanate, herein defined as the molecular structure of an isocyanate, diisocyanate, or polyisocyanate where all isocyanate groups NCO have been removed. For example, one method of making the compounds of the present invention includes reacting (b) a substituted sugar alcohol compound, or mixtures thereof, with (a) an isocyanate group-containing compound selected from an isocyanate, diisocyanate, polyisocyanate, or mixture thereof. Where multiple isocyanate groups are present, the isocyanate group-containing compound adds to the branched nature of the polymer. The term "polyisocyanate" is defined as di- and higher-functional isocyanates, and the term includes oligomers. Any monoisocyanate or polyisocyanate having predominately two or more isocyanate groups, or any isocyanate precursor of a polyisocyanate having predominately two or more isocyanate groups, is suitable for use in this invention. For example, hexamethylene diisocyanate homopolymers are suitable for use herein and are commercially available. In this case, Q would be a linear $C_6$ alkylene having cyclized isocyanate groups. It is recognized that minor amounts of diisocyanates can remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers, where Q is a trivalent linear alkylene having an isocyanurate group. Preferred is DESMODUR N-100 (a hexamethylene diisocyanate-based compound available from Bayer Corporation, Pittsburgh, Pa.). Other triisocyanates useful for the purposes of this invention are those obtained by reacting three moles of toluene diisocyanate, where Q is a trivalent polyaromatic ring structure having a cyclized isocyanate group. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3300, DESMODUR N-3600, DESMODUR Z-4470, DESMODUR H, DESMODUR N3790, and DESMODUR XP 2410, from Bayer Corporation, Pittsburgh, Pa., and bis-(4-isocyanatocylohexyl)methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Preferred as the (poly)isocyanate reactant for all the embodiments of the invention herein are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corporation) and diisocyanate trimers of formulas:

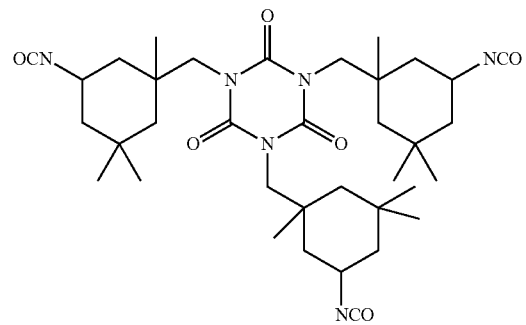
(Va)

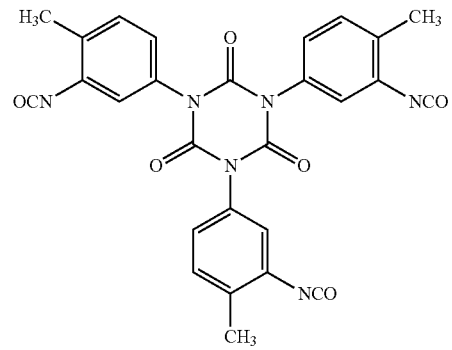
(Vb)

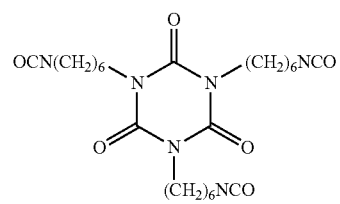
(Vc)

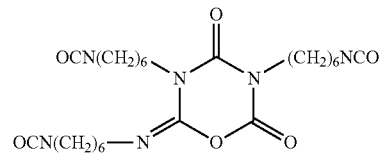
(Vd)

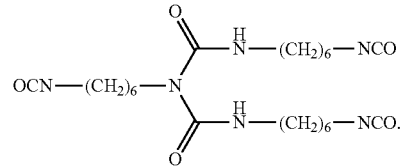
(Ve)

The diisocyanate trimers (Va-e) are available, for instance as DESMODUR Z4470, DESMODUR IL, DESMODUR N-3300, DESMODUR XP2410, and DESMODUR N100, respectively, from Bayer Corporation. In one embodiment, Q is selected from Formulas (IIIa), (IIIb), (IIIc), (IIId), or (IIIe):

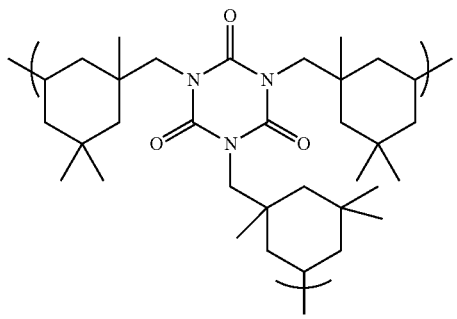 (IIIa)

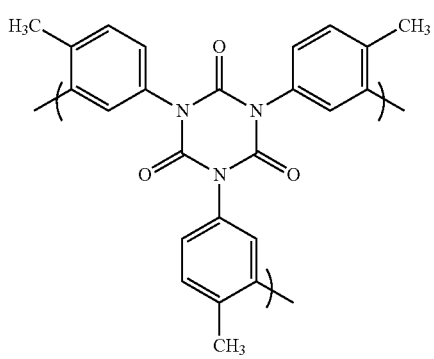 (IIIb)

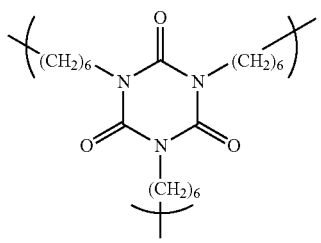 (IIIc)

(IIId)

(IIIe)

In one embodiment, the hydrophobic compound further comprises at least one linkage selected from Formulas (IVa), (IVb), (IVc), or mixtures thereof:

$$R^6\text{-D} \quad (IVa),$$

$$R^{15}\text{---}(OCH_2CH(OR^{16})CH_2)_z\text{---}OR^{17} \quad (IVb),$$

$$\text{---}NH\text{---}C(O)\text{---}NH\text{---}X \quad (IVc)$$

wherein D is selected from —N(R$^{12}$)—C(O)—NH—, —OC(O)NH—, —C(O)NH—, —SC(O)NH—, —O—(CH$_2$CH$_2$O)$_s$(CH(CH$_3$)CH$_2$O)$_t$—C(O)NH—, or —[C(O)]—O—(CH$_2$CH$_2$O)$_s$(CH(CH$_3$)CH$_2$O)$_t$—C(O)NH—; X is defined as above; R$^6$ is selected from a —C$_1$ to C$_{30}$ linear or branched alkyl optionally comprising at least one unsaturated group, a hydroxy- or urethane-functional C$_1$ to C$_{30}$ linear or branched alkyl, a hydroxy- or urethane-functional linear or branched C$_1$ to C$_{30}$ polyether, a hydroxy- or urethane-functional linear or branched polyester having a polyester polymer backbone, a hydroxy- or urethane-functional linear or branched organosiloxane, an amine- or urea-functional linear or branched organosiloxane, a thiol- or thiocarbonate functional C$_1$ to C$_{30}$ linear or branched alkyl, an amine- or urea-functional C$_1$ to C$_{30}$ linear or branched alkyl,

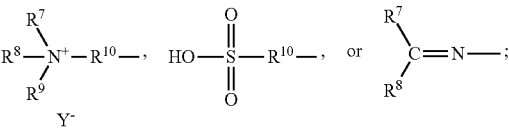

wherein R$^7$, R$^8$, and R$^9$ are each independently, —H, —C$_1$ to C$_6$ alkyl, or combinations thereof; R$^{10}$ is a divalent alkyl group of 1 to 20 carbons; R$^{12}$ is —H or a monovalent C$_1$ to C$_6$ alkyl group; R$^{15}$, R$^{16}$, and R$^{17}$ are each independently a —H, —C(O)NH—, —R$^{18}$; or —C(O)R$^{18}$ provided that at least one R$^{15}$, R$^{16}$, or R$^{17}$ is a —C(O)NH—; R$^{18}$ is independently a linear or branched alkyl group having 5 to 29 carbons optionally comprising at least 1 unsaturated bond; z is 1 to 15; Y is Cl; s is an integer of 0 to 50; t is an integer of 0 to 50; and s+t is greater than 0. Such a linkage may be formed by reacting active isocyanate groups with another isocyanate-reactive compound (c) selected from water, organic compounds of Formula (VIa)

$$R^5\text{-A} \quad (VIa), \text{ or}$$

organic compounds of Formula (VIb)

$$R^3\text{---}(OCH_2CH(OR^3)CH_2)_z\text{---}OR^3 \quad (VIb),$$

or mixtures thereof, wherein R$^5$ is selected from a —C$_1$ to C$_{30}$ linear or branched alkyl optionally comprising at least one unsaturated group, a hydroxy-functional C$_1$ to C$_{30}$ linear or branched alkyl, a hydroxy-functional linear or branched C$_1$ to C$_{30}$ polyether, a hydroxy-functional linear or branched polyester having a polyester polymer backbone, a hydroxy-functional linear or branched organosiloxane, an amine-functional linear or branched organosiloxane, a thiol-functional C$_1$ to C$_{30}$ linear or branched alkyl, an amine-functional C$_1$ to C$_{30}$ linear or branched alkyl,

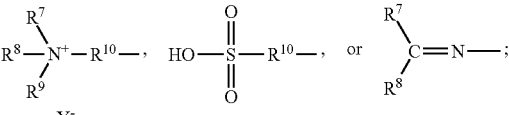

A is selected from —N(R$^{12}$)H, —OH, —COOH, —SH, —O—(CH$_2$CH$_2$O)$_s$(CH(CH$_3$CH$_2$O)$_t$—H, or (C(O)—O—(CH$_2$CH$_2$O)$_s$(CH(CH$_3$)CH$_2$O)$_t$H; R$^3$ is independently selected from —H; —R$^{18}$; or —C(O)R$^{18}$, provided that at least one R$^3$ is —H; z is defined as above; R$^{12}$ is defined as above; R$^{18}$ is defined as above; and s and t are defined as above. The term "branched", as used herein, means that the functional chain can be branched at any point, for example as a quarternary substituted carbon, and can contain any number of branched substitutions.

Preferably, the final compound contains 0% to about 1% of reactive isocyanate groups. In one embodiment, the molecular weight of the hydrophobic compound is at least 10,000 g/mol. In one embodiment, the linkage of Formula (I) composes 30 to 100% by mol of the total urethane linkages in the hydrophobic compound. When optimum durable water repellency is desired, the linkage of Formula (I) composes 80 to 100% by mol of the total urethane linkages in the hydrophobic compound. In another embodiment, the linkage of Formula (I) composes 90 to 100% by mol of the total urethane linkages in the hydrophobic compound. In a third embodiment, the linkage of Formula (I) composes 95 to 100% by mol of the total urethane linkages in the hydrophobic compound.

When optimum stain release is desired, the compound selected from Formula (VIa), (VIb), or water reacts with about 0.1 mol % to about 70 mol % of reactive isocyanate groups, and the substituted sugar alcohols react with about 30 mol % to about 99.9 mol % of reactive isocyanate groups, to form a urethane compound where about 30 mol % to about 99.9 mol % of total urethane linkages present in the compound fit Formula (I) and about 0.1 mol % to about 70 mol % of total reactive isocyanate groups present fit one or more of Formulas (IVa), (IVb), or (IVc). In another embodiment, the compound selected from Formula (VIa), (VIb), or water reacts with about 40 mol % to about 70 mol % of reactive isocyanate groups, and the substituted sugar alcohols react with about 30 mol % to about 60 mol % of reactive isocyanate groups, to form a urethane compound where about 30 mol % to about 60 mol % of total urethane linkages present in the compound fit Formula (I) and about 40 mol % to about 70 mol % of total reactive isocyanate groups present fit one or more of Formulas (IVa), (IVb), or (IVc). Preferably the number of linkages of Formula (I) is greater than the sum of linkages of Formulas (IVa), (IVb), and (IVc).

In one embodiment, the linkage of Formula (IVc) is present in the hydrophobic compound. Such a linkage is a urea functional group and can be formed from reacting water with active isocyanate groups in the compound. In a further embodiment, the linkage of Formula (IVa) is present, where D is —O—$(CH_2CH_2O)_s(CH(CH_3)CH_2O)_t$—C(O)NH—, or —[C(O)]—O—$(CH_2CH_2O)_s(CH(CH_3)CH_2O)_t$—C(O)NH—. Such a linkage may be formed by reacting a compound of Formula (VIa). Such a compound can be a hydrophilic water-solvatable material comprising at least one hydroxy-terminated polyether of Formula (VIa) wherein isocyanate-reactive group A is —O—$(CH_2CH_2O)_s(CH(CH_3)CH_2O)_t$—H or —[C(O)]—O—$(CH_2CH_2O)_s(CH(CH_3)CH_2O)_t$—H. In this embodiment, —$(CH_2CH_2O)$— represents oxyethylene groups (EO) and —$(CH(CH_3)CH_2O)$— represents oxypropylene groups (PO). These polyethers can contain only EO groups, only PO groups, or mixtures thereof. These polyethers can also be present as a tri-block copolymer designated PEG-PPG-PEG (polyethylene glycol-polypropylene glycol-polyethylene glycol). Preferably, the polyethers are the commercially available methoxypolyethylene glycols (MPEG's), or mixtures thereof. Also commercially available, and suitable for the preparation of the compositions of the present invention, are butoxypolyoxyalkylenes containing equal amounts by weight of oxyethylene and oxypropylene groups (Union Carbide Corp. 50-HB Series UCON Fluids and Lubricants) and having an average molecular weight greater than about 1000. In one aspect, the hydroxy-terminal polyethers of Formula (VIa) have an average molecular weight equal to or greater than about 200. In another aspect, the average molecular weight is between 350 and 2000.

In another embodiment, the linkage of Formula (IVa) is present, where D is —$N(R^{12})$—C(O)—NH—, —OC(O) NH—, —C(O)NH—, or —SC(O)NH—. Such a linkage may be formed from an organic compound of Formula (VIa), where isocyanate-reactive group A is —OH, —C(O) OH, —SH, or —$NH(R^{12})$; and $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester having a polyester polymer backbone, a hydroxy- or amine-functional linear or branched organosiloxane, a thiol-functional $C_1$ to $C_{30}$ linear or branched alkyl, an amine-functional $C_1$ to $C_{30}$ linear or branched alkyl.

Where D is —OC(O)NH— or A is —OH, examples of Formula (VIa) include but are not limited to alkyl alcohols such as propanol, butanol, or fatty alcohols including stearyl alcohol ($R^5$ is a —$C_1$ to $C_{30}$ linear or branched alkyl optionally comprising at least one unsaturated group); alkyl diols or polyols such as ethanediol, propanediol, butanediol, or hexanediol ($R^5$ is a hydroxy-functional $C_1$ to $C_{30}$ linear or branched alkyl); alkylene glycol ethers such as triethylene glycol, tetraethylene glycol, poly(ethylene glycol) (PEG), poly(propylene glycol) (PPG), poly(tetrahydrofuran), or glycol ethers having mixtures of PEG, PPG, or THF units ($R^5$ is a hydroxy-functional linear or branched $C_1$ to $C_{30}$ polyether); polyester polyols ($R^5$ is a hydroxy-functional linear or branched polyester having a polyester polymer backbone); silicone prepolymer polyols ($R^5$ is a hydroxy-functional linear or branched organosiloxane); N,N-dimethylaminoethanol ($R^5$ is an amine-functional $C_1$ to $C_{30}$ linear or branched alkyl); choline chloride or betaine HCl ($R^5$ is Y$^-$$(R^7)(R^8)(R^9)N^+R^{10}$—); butanone oxime ($R^5$ is $(R^7)(R^8)$C=N—). The polyether polyols can contain only EO groups, only PO groups, only THF groups, or mixtures thereof. These polyethers can also be present as a block copolymer, such as that designated by PEG-PPG-PEG (polyethylene glycol-polypropylene glycol-polyethylene glycol). In one aspect, the polyether glycols have an average molecular weight equal to or greater than about 200. In another aspect, the average molecular weight is between 350 and 2000.

Where D is —C(O)NH— or A is —COOH, examples of Formula (VIa) include but are not limited to fatty acids such as caprylic acid, capric acid, lauric acid, mysteric acid, palmitic acid, stearic acid, arachidic acid, behenic acid, lignoceric acid, palmitoleic acid, lineolic acid, arachidonic acid, oleic acid, or erucic acid ($R^5$ is a —$C_1$ to $C_{30}$ linear or branched alkyl optionally comprising at least one unsaturated group); hydroxy-containing acids such as hydroxycaprylic acid, hydroxycapric acid, hydroxylauric acid, hydroxymysteric acid, hydroxypalmitic acid, hydroxystearic acid, hydroxyarachidic acid, hydroxybehenic acid, hydroxylignoceric acid, hydroxypalmitoleic acid, hydroxylineolic acid, hydroxyarachidonic acid, hydroxyoleic acid, or hydroxyerucic acid ($R^5$ is a hydroxy-functional $C_1$ to $C_{30}$ linear or branched alkyl); and mercaptoalkanoic acids such as mercaptopropionic acid ($R^5$ is a thiol-functional $C_1$ to $C_{30}$ linear or branched alkyl).

Where D is —SC(O)NH— or A is —SH, specific examples of Formula (VIa) include but are not limited to alkyl thiols such as lauryl mercaptan or dodecyl mercaptan ($R^5$ is a —$C_1$ to $C_{30}$ linear or branched alkyl optionally comprising at least one unsaturated group). Where D is —$N(R^{12})$—C(O)—NH— or A is —$NH(R^{12})$, specific examples of Formula (VIa) include but are not limited to alkyl amines such as diisopropylamine, propylamine, hexylmine, or laurylamine ($R^5$ is a —$C_1$ to $C_{30}$ linear or branched alkyl optionally comprising at least one unsaturated group); alkanolamines such as ethanolamine or propanolamine ($R^5$ is a hydroxy-functional $C_1$ to $C_{30}$ linear or branched alkyl); silicone prepolymer polyamines ($R^5$ is a amine-functional linear or branched organosiloxane); alkyl diamines ($R^5$ is an amine-functional $C_1$ to $C_{30}$ linear or branched alkyl); and aminoalkanesulfonic acids such as 2-aminoethanesulfonic acid ($R^5$ is HO—S(O)$_2$R$^{10}$—).

In a further embodiment, the hydrophobic compound comprises a linkage of Formula (IVb). Such linkages may be formed by the reaction of active isocyanate groups with a compound of Formula (VIb). These compounds are commonly referred to as polyglycerols. These polyglycerols can be present where $R^3$ is independently a —H; —R$^{18}$; —C(O)R$^{18}$ provided that at least one $R^3$ is a —H; and wherein $R^{18}$ is independently a linear or branched alkyl group having 5 to 29 carbons optionally comprising at least 1 unsaturated bond. Specific examples include but are not limited to triglycerol monostearate, triglycerol distearate, hexaglycerol monostearate, hexaglycerol distearate, decaglyceryl mono (carpylate/caprate), decaglyceryl di(carpylate/caprate), decaglycerol, polyglycerol-3, and C18 diglyceride.

In one embodiment, the hydrophobic compound comprises more than one type of linkages selected from Formulas (IVa), (IVb), and (IVc). In addition to compounds of the present invention as described herein, these compositions may also comprise additional compounds that are present from commercially available sorbitans, polysorbates, alkyl citrates, or pentaethritols. These compounds can be present as a mixture of the various substituted sugar alcohols from fully unsubstituted to fully substituted, and the various substitutions in between, and optionally, the linear or branched alkyl group having 5 to 29 carbons comprises at least 1 unsaturated bond.

The aqueous compositions comprise the hydrophobic compound but may further comprise a solvent selected from organic solvents. However, the aqueous composition is in the form of an aqueous solution, an aqueous emulsion, or an aqueous dispersion.

In one embodiment, the invention relates to a method of preparing an aqueous composition comprising: (i) reacting (b') at least one sugar alcohol with (b") at least one fatty acid or alkoxylated fatty acid, and (ii) subsequently reacting the product of step (i) with (a) at least one isocyanate group-containing compound selected from isocyanate, diisocyanate, polyisocyanate, or mixture thereof; (iii) contacting the reagents or final product of step (ii) with a water carrier; wherein the (b') at least one sugar alcohol is selected from a saccharide, reduced sugar, aminosaccharide, aldonic acid, or aldonic acid lactone. The step (i) can be performed by any suitable esterification process. For example, U.S. Pat. No. 4,297,290 describes the synthesis of sorbitan esters, where an anhydro sorbitol is reacted with a fatty acid in the presence of an alkaline catalyst.

The aqueous compositions can be made in one step. The aqueous compositions comprising products of more than one substituted sugar alcohol residue and/or one or more linkages of Formulas (IVa), (IVb), and (IVc) can be also made in one step. In one embodiment, if more than one substituted sugar alcohol residue and/or one or more linkages of Formulas (IVa), (IVb), and (IVc) are present, then the synthesis can be completed sequentially. A sequential addition is especially useful when employing substituted sugar alcohols with high OH numbers, or when using polyfunctional compounds of Formulas (VIa) or (VIb). These steps comprise reacting (a) at least one isocyanate group-containing compound selected from isocyanate, diisocyanate, polyisocyanate, or mixtures thereof, and (b) at least one substituted sugar alcohol. When a second compound is used selected from water, Formula (VIa), or Formula (VIb), molar concentrations of the at least one substituted sugar alcohol are such that there remains unreacted isocyanate groups to react with the one or more compounds selected from water, Formula (VIa), or Formula (VIb).

This reaction is typically conducted by charging a reaction vessel with the isocyanate, diisocyanate, or polyisocyanate, and at least one substituted sugar alcohol, and optionally a second compound selected from water, Formula (VIa), or Formula (VIb). The order of reagent addition is not critical, but if water is used, the water should be added after the isocyanates and at least one substituted sugar alcohol are reacted.

The specific weight of the reactants charged is based on their equivalent weights and on the working capacity of the reaction vessel, and is adjusted so that substituted sugar alcohol will be consumed in the first step. A suitable dry organic solvent free of isocyanate-reactive groups is typically used as a solvent. Ketones are the preferred solvents, and methylisobutylketone (MIBK) is particularly preferred for convenience and availability. The charge is agitated, and temperature adjusted to about 40° C. to 70° C. Typically, a catalyst such as iron(III) chloride in an organic solvent is then added, typically in an amount of from about 0.01 to about 1.0 weight % based on the dry weight of the composition, and the temperature is raised to about 80° C. to 100° C. A co-catalyst, such as sodium carbonate, may also be used. If water is to be added, the initial reaction is conducted so that less than 100% of the isocyanate groups are reacted. In the second step after holding for several hours, additional solvent, water, and optionally a second compound are added. In one embodiment, and the mixture is allowed to react for several more hours or until all of the isocyanate has been reacted. Additional water can then be added along with surfactants, if desired, to the urethane compounds and stirred until thoroughly mixed. Following a homogenization or sonification step, the organic solvent can be removed by evaporation at reduced pressure, and the remaining aqueous solution or dispersion of the compound of the present invention can be used as is or subjected to further processing. The aqueous composition comprises at least one hydrophobic compound of the present invention, a water carrier, and optionally one or more surfactants.

It will be apparent to one skilled in the art that many changes to any or all of the above procedures can also be used to optimize the reaction conditions for obtaining maximum yield, productivity, or product quality.

In addition to the hydrophobic compounds of the present invention as described herein, the aqueous compositions may also comprise compounds that are present from commercially available sorbitans, polysorbates, alkyl citrates, or pentaerythritols. These compounds can be present as a mixture of the various substituted organic compounds of Formula (IIa), (IIb), or (IIc) from fully unsubstituted to fully substituted, and the various substitutions in between, and optionally, the linear or branched alkyl group having 5 to 29 carbons comprises at least 1 unsaturated bond.

In one embodiment, the aqueous composition further comprises inorganic oxide particles. These particles may be any suitable inorganic oxide particles, including but not limited to oxide particles of Si, Ti, Zn, Zr, Mn, Al, and combinations thereof. Specific examples include silica and titanium dioxide. In one aspect, the particles are present during the urethane reaction such that at least a portion of the particles are covered by the urethanes of the invention. In another aspect, the urethanes of the invention form a shell surrounding the inorganic particles.

It will be apparent to one skilled in the art that many changes to any or all of the above procedures can also be used to optimize the reaction conditions for obtaining maximum yield, productivity, or product quality.

In another embodiment, the invention relates to a method of treating a fibrous substrate comprising applying to the surface of the substrate an aqueous composition comprising at least one hydrophobic compound having at least one linkage of Formula I:

—NHC(O)—X—            (I)

wherein X is the residue of a cyclic or acyclic sugar alcohol which is substituted with at least one —$R^1$; —$C(O)R^1$; —$(CH_2CH_2O)_n(CH(CH_3)CH_2O)_mR^2$; —$(CH_2CH_2O)_n(CH(CH_3)CH_2O)_mC(O)R^1$; or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, a linear or branched alkyl group having 6 to 30 carbons optionally comprising at least 1 unsaturated bond, or mixtures thereof.

The composition of the present invention as described above is contacted with the substrate by any suitable method. Such methods include, but are not limited to, application by exhaustion, foam, flex-nip, nip, pad, kiss-roll, beck, skein, winch, liquid injection, overflow flood, roll, brush, roller, spray, dipping, immersion, and the like. The composition is also contacted by use of a beck dyeing procedure, continuous dyeing procedure or thread-line application.

The composition of the present invention is applied to the substrate as such, or in combination with other optional textile finishes or surface treating agents. Such optional additional components include treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain release, soil repellency, soil release, water repellency, odor control, antimicrobial, sun protection, cleanability and similar effects. Such components may be fluorinated or non-fluorinated. One or more of such treating agents or finishes are applied to the substrate before, after, or simultaneously with the composition of the present invention. For example, for fibrous substrates, when synthetic or cotton fabrics are treated, use of a wetting agent can be desirable, such as ALKANOL 6112 available from E. I. du Pont de Nemours and Company, Wilmington, Del. When cotton or cotton-blended fabrics are treated, a wrinkle-resistant resin can be used such as PERMAFRESH EFC available from Omnova Solutions, Chester, S.C.

Other additives commonly used with such treating agents or finishes are also optionally present, such as surfactants, pH adjusters, cross linkers, wetting agents, wax extenders, and other additives known by those skilled in the art. Suitable surfactants include anionic, cationic, nonionic, N-oxides and amphoteric surfactants. Examples of such additives include processing aids, foaming agents, lubricants, anti-stains, and the like. The composition is applied at a manufacturing facility, retailer location, or prior to installation and use, or at a consumer location.

Optionally, a blocked isocyanate is added with the composition of the present invention to further promote durability (i.e., as a blended composition). An example of a suitable blocked isocyanate to use in the present invention is PHOBOL XAN available from Huntsman Corp, Salt Lake City, Utah. Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to the substrate. When added as a blended isocyanate, amounts up to about 20% by weight are added.

The optimal treatment for a given substrate depends on (1) the characteristics of the compound or composition of the present invention, (2) the characteristics of the surface of the substrate, (3) the amount of compound or composition of the present invention applied to the surface, (4) the method of application of the compound or composition of the present invention onto the surface, and many other factors. Some compounds or compositions of the present invention work well on many different substrates and are repellent to water. Dispersions prepared from compounds of the present invention are generally applied to fibrous substrates by spraying, dipping, padding, or other well-known methods. After excess liquid has been removed, for example by squeeze rolls, the treated fibrous substrate is dried and then cured by heating, for example, to from about 100° C. to about 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features.

In another embodiment, the present invention is a fibrous substrate having applied to its surface a composition as disclosed above. The present invention further comprises substrates treated with a compound or composition of the present invention as described above. Suitable substrates include fibrous substrates. The fibrous substrates include fibers, yarns, fabrics, fabric blends, textiles, nonwovens, paper, leather, and carpets. These are made from natural or synthetic fibers including cotton, cellulose, wool, silk, rayon, nylon, aramid, acetate, acrylic, jute, sisal, sea grass, coir, polyamide, polyester, polyolefin, polyacrylonitrile, polypropylene, polyaramid, or blends thereof. By "fabric blends" is meant fabric made of two or more types of fibers. Typically these blends are a combination of at least one natural fiber and at least one synthetic fiber, but also can include a blend of two or more natural fibers or of two or more synthetic fibers. The nonwoven substrates include, for example, spunlaced nonwovens, such as SONTARA available from E. I. du Pont de Nemours and Company, Wilmington, Del., and spunbonded-meltblown-spunbonded nonwovens. The treated substrates of the present invention have excellent water repellency and optionally stain release properties.

The compounds, compositions, method, and substrates of the present invention are useful to provide excellent water repellency and optionally stain release to treated substrates. The surface properties are obtained using a non-fluorinated organic urethane as defined above. The use of non-fluorinated organic urethane have been found to provide superior water repellency and durable water repellency compared to traditional non-fluorinated water repellents and are comparable to commercially available fluorinated water repellents. The treated substrates of the present invention are useful in a variety of applications and products such as clothing, protective garments, carpet, upholstery, furnishings, and other uses. The excellent surface properties described above help to maintain surface cleanliness and therefore can permit longer use.

Test Methods and Materials

All solvents and reagents, unless otherwise indicated, were purchased from Sigma-Aldrich, St. Louis, Mo., and used directly as supplied. MPEG 750 and MPEG 1000 are defined as poly(ethylene glycol) methyl ether 750 and poly(ethylene glycol) methyl ether 1000, respectively, and are commercially available from Sigma-Aldrich, St. Louis, Mo. Tergitol® TMN-10 is commercially available from Sigma-Aldrich, St. Louis, Mo.

Sorbitan tristearate and sorbitan monostearate are commercially available from Croda, East Yorkshire, England, or DuPont Nutrition & Health, Copenhagen, Denmark. Low-OH sorbitan tristearate (OH value <65), dipentaerythritol esters, sorbitan ester—lauric acid, sorbitan tribehenin 40, sorbitan tribehenin 50, sorbitan tribehenin 88, and glycerol distearate was obtained from DuPont Nutrition & Health, Copenhagen, Denmark.

DESMODUR N-100, DESMODUR H, DESMODUR I, DESMODUR N3300, DESMODUR N3790BA, DESMODUR Z4470, and DESMODUR XP2410 were obtained from Bayer Corporation, Pittsburgh, Pa.

JEFFAMINE M-1000, JEFFAMINE M-2070, and PHOBOL XAN were obtained from Huntsman Corp., Salt Lake City, Utah.

PRIPOL 2033 (amorphous dimer diol), PRIAMINE 1075 (dimer diamine), PRIPLAST 3293 (semicrystalline polyester polyol), sorbitan trioleate, polyoxyethylenesorbitan tristearate, polyoxyethylenesorbitan trioleate, tetraethoxysorbitan monostearate, polyoxyethylenesorbitan monostearate, and polyoxyethylene(4) sorbitan monostearate were obtained from Croda, East Yorkshire, England.

Tri(2-octadodecyl) citrate is commercially available from Lubrizol, Wickliffe, Ohio.

SILMER OH Di-10 (a small linear di-functional hydroxyl-terminated silicone pre-polymer) and SILMER NH Di-8 (a linear silicone with reactive amine terminal groups) are available from Siltech Corporation, Toronto, Canada.

PLURONIC L35 is commercially available from BASF, Ludwigshafen, Germany. ARMEEN DM-18D was obtained from Akzo-Nobel, Bridgewater, N.J.

Triglycerol monostearate and hexaglycerol distearate were obtained from Lonza, Allendale, N.J.

Decaglyceryl mono(caprylate/caprate) was obtained from Stepan, Northfield, Ill.

Polyglycerol-3 was obtained from Solvay Chemicals, Houston, Tex.

The following test methods and materials were used in the examples herein.

Test Method 1—Water Repellency

The water repellency of a treated substrate was measured according to the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance the finished substrate has to staining by water-based substances. The composition of standard test liquids is shown in the following Table 1. Ratings of 0.5 increments are determined by subtracting one half from the numbers in Table 1 for borderline passing of the test liquid.

TABLE 1

Standard Test Liquids

| Water Repellency Rating Number | Composition Vol. %, Isopropyl Alcohol | Composition, Vol. % Distilled Water |
|---|---|---|
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Test Method 2—Spray Test

The dynamic water repellency of treated substrates was measured according to the American Association of Textile Chemists and Colorists (AATCC) TM-22. Samples are visually scored by reference to published standards, with a rating of 100 denoting no water penetration or surface adhesion. A rating of 90 denotes slight random sticking or wetting without penetration; lower values indicate progressively greater wetting and penetration. Test Method 2, the dynamic water repellency test, is a demanding and realistic test of water repellency.

Test Method 3—Stain Release

This test measures the ability of a fabric to release oily stains during home laundering.

Treated textiles are placed on a flat surface. Using an eyedropper, 5 drops of MAZOLA Corn Oil or mineral oil (0.2 mL) were placed onto the fabric to form 1 drop of oil. A weight (5 lb, 2.27 kg) is placed on top of the oil drop with a piece of glassine paper separating the oil drop. The weight was left in place for 60 seconds. After 60 seconds, the weight and glassine paper are removed. The textiles samples were then washed using a automatic washer high for 12 minutes with AATCC 1993 Standard Reference Detergent WOB12 or granular detergent (100 g). The textiles were then dried on high for 45-50 minutes. The textiles were then evaluated for residual stain of 1 to 5, 1 having the largest residual stain remaining and 5 being no stain residual was visible. In the examples below, stain release ratings of corn oil are designated by the term "Corn Oil", and stain release ratings of mineral oil are designated by the term "Mineral Oil".

Test Method 4—Fabric Treatment

The fabrics treated in this study were 100% by weight khaki cotton twill available from SDL Atlas Textile Testing Solutions, Rock Hill, S.C. 29732 and 100% by weight red polyester fabric available from L. Michael OY, Finland. The fabric was treated with the aqueous dispersions various emulsion polymer using a conventional pad bath (dipping) process. The prepared concentrated dispersion of the polymer emulsions were diluted with deionized water to achieve a pad bath having 60 g/L or 100 g/L of the final emulsion in the bath.

Examples of the compounds and compositions of the instant invention can be made from various isocyanates and organic compounds of Formulas (Ia), (Ib), (Ic), or mixtures thereof. The present invention is not to be limited by the examples below.

Preparation of Trioctadecyl Citrate

In a 4-neck round bottom flask equipped with an overhead stirrer, thermocouple, dean-stark/condenser was added stearyl alcohol (100.0 g), citric acid (20 g), toluene (150 g) and sulfuric acid (2 g). The solution was refluxed for 8 hours to facility the removal of the water generated during the esterification. After the 8 hours, the crude citrate was precipitated at 0° C., filtered, and recrystallized using ethanol.

Preparation of Myo-Inositol Laurate

Into a 4-neck round bottom flask equipped with an overhead stirrer, thermocouple, Dean-Stark trap, and condenser was added Myo-Inositol (15.0 g), Lauric acid (75.05 g), toluene (90.05 g), p-toluenesulfonic acid (~2 g), and sulfuric acid (0.5 g). The solution was heated to about 120° C. and refluxed to remove the water from the reaction. Once all of the water was removed, the reaction was cooled to 70° C. and a 10 wt. % solution of sodium hydroxide (13.0 g) was added. The reaction was stirred for one hour and then cooled to room temperature with stirring. The reaction mass was vacuum filtered and the collected solid dried in a vacuum oven overnight.

Preparation of Myo-Inositol Stearate

The Preparation of Myo-Inositol Laurate procedure was repeated, using stearic acid (106.5 g) instead of lauric acid.

Preparation of Mannitol Behenin

Into a 4-neck round bottom flask equipped with an overhead stirrer, thermocouple, and a condenser was added mannitol (12 g), behenic acid (56 g), and 10 wt. % solution of sodium hydroxide (5.0 g). The reactor was heated to about 220° C. for 4 hours. The reaction was cooled to 80° C. and an 85 wt. % solution of phosphoric acid was added (0.48 g). The reaction was stirred for one hour, cooled to ~30° C. and vacuum filtered. The solid was collected and dried in a vacuum oven overnight at 60° C.

Preparation of Xylitol Laurate

The Preparation of Mannitol Behenin procedure was repeated, using xylitol (20 g) instead of mannitol, and using lauric acid (39.6 g) instead of behenic acid.

Preparation of Xylitol Behenin

The Preparation of Mannitol Behenin procedure was repeated, using behenic acid (40.2 g), and using of xylitol (12 g) instead of mannitol.

Preparation of Meso-Erythritol Laurate

The Preparation of Mannitol Behenin procedure was repeated, using lauric acid (20.5 g) instead of behenic acid, and using of meso-erythritol (25 g) instead of mannitol.

Preparation of Xylose Laurate

Into a 4-neck round bottom flask equipped with an overhead stirrer, thermocouple, and a condenser was added xylose (10.0 g), lauroyl chloride (36.43 g), and dichloromethane (100 g). The reaction was stirred at room temperature. Triethylamine (16.85 g) was added drop wise over 10 minutes. Activated carbon (10.0 g) was added to the reactor. The reaction was stirred for one hour and filtered. The dichloromethane was collected and distilled off using a rotary evaporator. The remaining liquid was collected and cooled to room temperature to solidify.

Preparation of Xylose Palmitate

The Preparation of Xylose Laurate was repeated, using palmitoyl chloride (22.9 g) instead of lauroyl chloride, and with all other reagent weights halved.

Preparation of Glucose Laurate

The Preparation of Xylose Laurate was repeated, using glucose (5 g) instead of xylose, and using 21.25 g of lauroyl chloride and 60 g of methylene chloride.

Preparation of Glucose Palmitate

The Preparation of Xylose Laurate was repeated, using glucose (5 g) instead of xylose, and using 26.7 g of palmitoyl chloride and 70 g of methylene chloride.

EXAMPLE 1

In a 4-neck round bottom flask equipped with an overhead stirrer, thermocouple, dean-stark/condenser was added sorbitan tristearate (116.0 g; Hydroxy Number=77.2 mgKOH/g) and 4-methyl-2-pentanone (MIBK, 150 g). The solution was refluxed for 1 hour to remove any residual moisture. After the hour, the solution was cooled to 50° C. and DESMODUR N-100 (30 g) was added followed by a catalyst and the solution was heated to 80° C. over one hour.

EXAMPLE 2

An aqueous dispersion of the compound as described in Example 1 was prepared. Water (300 g), ARMEEN DM-18D (5.6 g), TERGITOL TMN-10 (2.8 g), and acetic acid (3.4 g) was added to a beaker and stirred to from a surfactant solution. The solution was heated to 60° C. The sorbitan urethane/MIBK solution, as prepared in Example 1, was cooled to 60° C. and the surfactant solution was added slowly to produce a milky emulsion. The mixture was homogenized at 6000 psi, and the resulting emulsion was distilled under reduced pressure to remove the solvent, yielding a non-flammable urethane dispersion at 25% solids. This urethane dispersion was applied to textiles and tested according to the test methods above.

EXAMPLES 3 TO 23

Examples 3 to 23 demonstrate various compounds of the present invention prepared as described in Examples 1 (compounds) and Example 2 (dispersions) with an isocyanate (DESMODUR N100) and one or more different compounds of Formula (Ia) such as sorbitan tristearate, sorbitan trioleate, sorbitain monostearate, and mixtures thereof. When more than one sorbitan ester reagent was used, the second sorbitan reagent was added, and the reaction mixture was heated at 80° C. for an additional four hours. Examples 3 to 23 were applied as dispersions to textiles at 60 g/L, and tested according to the test methods above.

COMPARATIVE EXAMPLE A

Comparative Example A represents an aqueous dispersion made using the compound of Formula (Ia), without an isocyanate compound. Water (166.0 g), ARMEEN DM-18D (2.29 g), TERGITOL TMN-10 (1.6 g), and acetic acid (1.4 g) were added to a beaker and stirred to form a surfactant solution. The solution was heated to 60° C. Sorbitan tristearate (60.52 g; Hydroxy Number=69.5 mgKOH/g), was heated to 80° C. and the surfactant solution was added slowly to produce a milky emulsion. The mixture was homogenized at 6000 psi, and the resulting emulsion was distilled under reduced pressure to remove the solvent, yielding a non-flammable dispersion at 25% solids. This dispersion was applied to textiles and tested according to the test methods above.

COMPARATIVE EXAMPLE B

Untreated fabric samples were tested according to the test methods above.

TABLE 2

Compositions of Examples 2 to 23.

| | Component (a) Desmodur N100 (g) | Component (b) Sorbitan Tristearate (g) | Sorbitan Trioleate (g) | Sorbitan Monostearate (g) |
|---|---|---|---|---|
| Ex. 2 | 30.0 | 116.0 | 0 | 0 |
| Ex. 3 | 30.1 | 0 | 147.0 | 0 |
| Ex. 4 | 30.0 | 58.0 | 70.0 | 0 |
| Ex. 5 | 30.0 | 113.5 | 0 | 1.2 |
| Ex. 6 | 30.0 | 81.2 | 0 | 10.8 |
| Ex. 7 | 30.0 | 98.6 | 0 | 5.4 |
| Ex. 8 | 30.0 | 0 | 102.5 | 11.2 |
| Ex. 9 | 30.2 | 0 | 125.0 | 5.4 |
| Ex. 10 | 30.0 | 113.5 | 0 | 1.2 |
| Ex. 11 | 30.2 | 49.3 | 62.0 | 5.4 |
| Ex. 12 | 30.0 | 49.3 | 62.0 | 5.4 |
| Ex. 13 | 30.1 | 49.3 | 62.0 | 5.4 |
| Ex. 14 | 30.0 | 49.3 | 59.5 | 5.4 |
| Ex. 15 | 30.0 | 40.6 | 49.0 | 10.8 |
| Ex. 16 | 30.0 | 49.3 | 59.5 | 5.4 |
| Ex. 17 | 30.0 | 74.0 | 45.0 | 1.4 |
| Ex. 18 | 30.0 | 1.2 | 135.25 | 0 |
| Ex. 19 | 30.0 | 105.5 | 0 | 3.5 |
| Ex. 20 | 30.0 | 127.5 | 0 | 1.25 |
| Ex. 21 | 30.0 | 115.4 | 0 | 1.25 |
| Ex. 22 | 30.0 | 113.8 | 0 | 1.25 |
| Ex. 23 | 15.0 | 60.1 | 0 | 0.61 |
| Comp. Ex. A | 0 | 60.52 | 0 | 0 |

TABLE 3

Performance Data of Examples 2 to 23 and Comparative Example A

| | Cotton Water Drop | Cotton Spray | Polyester Water Drop | Polyester Spray |
|---|---|---|---|---|
| Ex. 2 | 4 | 100 | — | — |
| Ex. 3 | 2 | 75 | 0 | 80 |
| Ex. 4 | 3 | — | 3 | — |
| Ex. 5 | 4 | 100 | — | — |
| Ex. 6 | 3 | — | 3 | — |
| Ex. 7 | 3 | — | 3 | — |
| Ex. 8 | 2 | 80 | 2 | 0 |
| Ex. 9 | 2 | 75 | 0 | 0 |
| Ex. 10 | 3 | 80 | 3 | 100 |
| Ex. 11 | 4 | 90 | 3 | 100 |
| Ex. 12 | 4 | 90 | 3 | 100 |
| Ex. 13 | 4 | 90 | 3 | 100 |
| Ex. 14 | 3 | — | 3 | — |
| Ex. 15 | 3 | — | 3 | — |
| Ex. 16 | 3 | — | 3 | — |
| Ex. 17 | 4 | 100 | — | — |
| Ex. 18 | 3 | 80 | — | — |
| Ex. 19 | 4 | 100 | — | — |
| Ex. 20 | 3 | 80 | 3 | 100 |
| Ex. 21 | 3 | 100 | 3 | 100 |
| Ex. 22 | 3 | 100 | 3 | 100 |
| Ex. 23 | 3 | 90 | — | — |
| Comp. Ex. A | 3 | 50 | 1 | 50 |
| Comp. Ex. B | 0 | 0 | 0 | 0 |

EXAMPLES 24 TO 31

Examples 24 to 31 follow the procedures of Examples 1 (compounds) and Example 2 (dispersions), using various isocyanates and from one to two different compounds of Formula (Ia) as described in Table 4. When more than one compounds of Formula (Ia) was used, the second compound was added, and the reaction mixture was heated at 80° C. for an additional four hours. Examples 24 to 31 were applied as dispersions to textiles at 60 g/L, and tested according to the test methods described above.

TABLE 4

Compositions of Examples 24 to 31

| Ex. | Component (a) Compound | Amount (g) | Component (b) Sorbitan Tristearate (g) | Sorbitan Trioleate (g) | Sorbitan Monostearate (g) |
|---|---|---|---|---|---|
| 24 | Desmodur H | 26.4 | 113.5 | 0 | 1.2 |
| 25 | Desmodur I | 24.7 | 0 | 212.8 | 0 |
| 26 | Desmodur N3300 | 30.4 | 0 | 135.25 | 1.2 |
| 27 | Desmodur N3790BA | 15.0 | 45.35 | 0 | 0.5 |
| 28 | Desmodur Z4470BA | 22.5 | 44.25 | 0 | 0.75 |
| 29 | Desmodur XP2410 | 15.0 | 59.5 | 0 | 0.9 |
| 30 | Desmodur I | 24.7 | 0 | 212.8 | 0 |
| 31 | Desmodur I | 30.2 | 113.5 | 0 | 1.2 |

TABLE 5

Performance Data of Examples 24 to 31

| | Cotton Water Drop | Cotton Spray | Polyester Water Drop | Polyester Spray |
|---|---|---|---|---|
| Ex. 24 | 3 | 85 | 3 | 100 |
| Ex. 25 | 3 | 70 | 3 | 80 |
| Ex. 26 | 3 | 75 | — | — |
| Ex. 27 | 3 | 90 | — | — |
| Ex. 28 | 3 | 100 | — | — |
| Ex. 29 | 3 | 100 | — | — |
| Ex. 30 | 4 | 100 | — | — |
| Ex. 31 | 3 | 70 | — | — |

EXAMPLES 32 TO 36

Examples 32 to 36 follow the procedures of Examples 1 (compounds) and Example 2 (dispersions), using DESMODUR N-100 isocyanate, one to two different compounds of Formula (Ia), and an acid monomer as described in Table 6. Example 36 also included a stearyl alcohol monomer. The acid monomer, stearyl alcohol, and any additional compounds of Formula (Ia) were added to the reaction after the initial compound of Formula (Ia) and isocyanate had reacted for 1 hour, and the reaction mixture was heated at 80° C. for an additional four hours. Examples 32 to 36 were applied as dispersions to textiles at 60 g/L, and tested according to the test methods described above.

TABLE 6

Compositions of Examples 32 to 36

| | Comp. (a) | Component (b) | | Component (c) | |
|---|---|---|---|---|---|
| | Desmodur N100 (g) | Sorbitan Tristearate (g) | Sorbitan Monostearate (g) | Compound | Amt (g) |
| Ex. 32 | 29.9 | 72.2 | 1.4 | Behenic Acid | 16.5 |
| Ex. 33 | 30.0 | 73.3 | 1.4 | Erucic Acid | 16.8 |
| Ex. 34 | 30.0 | 36.1 | 1.4 | Behenic Acid | 41.5 |
| Ex. 35 | 29.9 | 41.1 | 1.4 | Behenic Acid | 45.5 |
| Ex. 36 | 30.0 | 73.4 | 1.4 | Behenic Acid/ Stearyl Alcohol | 8.2/ 6.8 |

TABLE 7

Performance Data of Examples 32 to 36

| | Cotton | | Polyester | |
|---|---|---|---|---|
| | Water Drop | Spray | Water Drop | Spray |
| Ex. 32 | 3 | 85 | 3 | 100 |
| Ex. 33 | 3 | 90 | 3 | 100 |
| Ex. 34 | 3 | 80 | 2 | 100 |
| Ex. 35 | 3 | 50 | 2 | 50 |
| Ex. 36 | 3 | 85 | 3 | 85 |

EXAMPLES 37 TO 54

Examples 37 to 54 follow the procedures of Examples 1 (compounds) and Example 2 (dispersions), using an isocyanate, one to two different compounds of Formula (Ia), and MPEG 750 as described in Table 8. The MPEG 750 and any additional compounds of Formula (Ia) were added to the reaction after the initial compound of Formula (Ia) and isocyanate had reacted for 1 hour, and the reaction mixture was heated at 80° C. for an additional four hours. Examples 37 to 54 were applied as dispersions to textiles at 60 g/L, and tested according to the test methods described above.

TABLE 8

Compositions of Examples 37 to 54

| | Component (a) | | Component (b) | | | | Component (c) |
|---|---|---|---|---|---|---|---|
| Ex | Compound | Amt (g) | Sorbitan Tristearate (g) | Sorbitan Monostearate (g) | Sorbitan Distearate (g) | Sorbitan Tetrastearate (g) | MPEG 750 (g) |
| 37 | Desmodur N100 | 27.4 | 50.0 | 1.3 | 0 | 0 | 51.6 |
| 38 | Desmodur N100 | 22.8 | 50.0 | 1.1 | 0 | 0 | 34.4 |
| 39 | Desmodur N100 | 34.2 | 50.0 | 1.7 | 0 | 0 | 77.5 |
| 40 | Desmodur N3300 | 24.9 | 50.0 | 4.2 | 0 | 0 | 46.5 |
| 41 | Desmodur H | 10.8 | 50.0 | 4.2 | 0 | 0 | 46.5 |
| 42 | N3790BA | 30.5 | 50.0 | 4.2 | 0 | 0 | 46.5 |
| 43 | Z4470BA | 45.6 | 50.0 | 4.2 | 0 | 0 | 46.5 |
| 44 | Desmodur N100 | 24.6 | 50.0 | 4.2 | 0 | 0 | 46.5 |
| 45 | Desmodur N100 | 24.6 | 50.0 | 0 | 0 | 0 | 46.5 |
| 46 | Desmodur N100 | 12.0 | 17.2 | 2.2 | 0 | 0 | 23.6 |
| 47 | Desmodur N100 | 12.0 | 0 | 4.5 | 0 | 0 | 33.0 |
| 48 | Desmodur N100 | 12.5 | 36.9 | 0 | 0 | 0 | 14.7 |
| 49 | Desmodur N3300 | 12.0 | 15.1 | 0 | 0 | 0 | 32.6 |
| 50 | Desmodur N3300 | 12.0 | 20.0 | 4.4 | 0 | 0 | 13.9 |
| 51 | Desmodur N100 | 12.3 | 15.6 | 0 | 0 | 0 | 33.9 |
| 52 | Desmodur N3300 | 12.0 | 35.1 | 0 | 0 | 0 | 14.0 |
| 53 | Desmodur N100 | 12.7 | 0 | 0 | 23.0 | 0 | 24.9 |
| 54 | Desmodur N100 | 12.1 | 0 | 0 | 0 | 40.8 | 23.8 |

TABLE 9

Performance Data of Examples 37 to 54

| | Cotton | | | |
|---|---|---|---|---|
| | Water Drop | Corn Oil | Mineral Oil | Spray |
| Ex. 37 | 3 | 3.5 | 3 | 75 |
| Ex. 38 | 3 | 3.5 | 3 | 75 |
| Ex. 39 | 3 | 3.5 | 3 | 75 |
| Ex. 40 | 3 | 4 | 3 | — |
| Ex. 41 | 2 | 4 | 3 | — |
| Ex. 42 | 3 | 3.5 | 3 | — |
| Ex. 43 | 3 | 3.5 | 3 | — |
| Ex. 44 | 2 | 4.5 | 4.5 | — |
| Ex. 45 | 2 | 4 | 4 | — |
| Ex. 46 | 3 | 4 | 3 | 70 |
| Ex. 47 | 1 | 3.5 | 3.5 | 0 |
| Ex. 48 | 3.5 | 2 | 1 | 85 |
| Ex. 49 | 3 | 4.5 | 3 | 50 |
| Ex. 50 | 3.5 | 3 | 1 | 85 |
| Ex. 51 | 3 | 4.5 | 3 | 50 |
| Ex. 52 | 3.5 | 3 | 1 | 85 |
| Ex. 53 | 4 | 3 | 2 | 75 |
| Ex. 54 | 4 | 2.5 | 1 | 80 |

EXAMPLES 55 TO 62

Examples 55 to 62 follow the procedures of Examples 1 (compounds) and Example 2 (dispersions), using DESMODUR N-100 isocyanate, sorbitan tristearate, a glycol or alkoxylated monomer, and up to one additional reagent as described in Table 10. The glycol or alkoxylated monomer and additional reagents were added to the reaction after the initial compound of Formula (Ia) and isocyanate had reacted for 1 hour, and the reaction mixture was heated at 80° C. for an additional four hours. Examples 55 to 62 were applied as dispersions to textiles at 60 g/L, and tested according to the test methods described above.

TABLE 10

Compositions of Examples 55 to 62

| Ex. | Component (a) Desmodur N100 (g) | Component (b) Sorbitan Tristearate (g) | Component (c) Formula (IIIa) Compound | Amt (g) | Component (c) Additional Compound | Amt (g) |
|---|---|---|---|---|---|---|
| 55 | 12.7 | 14.6 | MPEG 1000 | 44.2 | N,N-Dimethyl-aminoethanol | 0.3 |
| 56 | 12.5 | 14.3 | MPEG 1000 | 43.5 | Choline Chloride | 0.5 |
| 57 | 13.3 | 15.2 | MPEG 1000 | 46.2 | 2-amino-ethanesulfonic acid | 0.4 |
| 58 | 12.1 | 14.6 | Jeffamine M-1000 | 44.3 | | |
| 59 | 12.3 | 14.8 | Jeffamine M-2070 | 90.1 | | |
| 60 | 1.7 | 6.2 | polypropylene glycol | 0.1 | | |
| 61 | 1.7 | 6.2 | tetrathylene glycol dodecyl ether | 0.2 | | |
| 62 | 1.7 | 5.9 | tetrathylene glycol dodecyl ether | 0.3 | | |

TABLE 11

Performance Data of Examples 55 to 62

| | Cotton | | | | Polyester | |
|---|---|---|---|---|---|---|
| | Water Drop | Corn Oil | Mineral Oil | Spray | Water Drop | Spray |
| Ex. 55 | 1 | 3 | 3 | 50 | — | — |
| Ex. 56 | 2 | 4 | 3 | 50 | — | — |
| Ex. 57 | 2 | 3 | 2.5 | 50 | — | — |
| Ex. 58 | 2 | 3.5 | 3 | 60 | — | — |
| Ex. 59 | 0.5 | 3.5 | 3 | 25 | — | — |
| Ex. 60 | 3 | — | — | 80 | 3 | 95 |
| Ex. 61 | 3 | — | — | 85 | 3 | 65 |
| Ex. 62 | 3 | — | — | 80 | 3 | 90 |

EXAMPLES 63 AND 64

Examples 63 and 64 follow the procedures of Examples 1 (compounds) and Example 2 (dispersions), using DESMODUR N-100 isocyanate, an alkoxylated sorbitan ester, and up to one additional reagent as described in Table 12. The additional reagents were added to the reaction after the initial compound of Formula (Ia) and isocyanate had reacted for 1 hour, and the reaction mixture was heated at 80° C. for an additional four hours. Examples 63 and 64 were applied as dispersions to textiles at 60 g/L, and tested according to the test methods described above.

EXAMPLE 65

Example 65 employs the use of DESMODUR N-100 isocyanate, an alkoxylated sorbitan ester, and MPEG 750 as described in Table 12. To a 40 mL scintillation vial, placed on a hotplate/stirrer and equipped with a nitrogen line and stir bar, tetraethoxysorbitan monostearate (0.8 g), and 8.5 g 4-methyl-2-pentanone (MIBK) were charged. The solution was stirred and heated to 55° C. for 10 minutes under nitrogen. Desmodur N-100 (1.7 g) was added and the reaction temperature was increased to 80° C. A 0.5 wt % Iron(III) chloride solution (in MIBK) was added and the reaction temperature was increased to 95° C. After six hours, MPEG 750 (4.5 g) was added. The reaction temperature was decreased to 80° C. and stirred overnight. The resulting mixture was standardized to 25% solids, applied to textiles at 60 g/L and tested according to the test methods above.

EXAMPLES 66 TO 69

Examples 66 to 69 follow the procedures of Example 65, using DESMODUR N-100 isocyanate, an alkoxylated sorbitan ester, and up to one additional reagent as described in Table 12. The additional reagents were added to the reaction after the initial compound of Formula (Ia) and isocyanate had reacted for 6 hours, and the reaction mixture was heated at 80° C. overnight. Examples 66 to 69 were applied as dispersions to textiles at 60 g/L, and tested according to the test methods described above.

TABLE 12

Compositions of Examples 63 to 69

| | Example | 63 | 64 | 65 | 66 | 67 | 68 | 69 |
|---|---|---|---|---|---|---|---|---|
| Component (a) | Desmodur N100 (g) | 8.2 | 7.2 | 1.7 | 1.5 | 1.5 | 1.5 | 1.5 |
| Component (b) | Polyoxy-ethylene sorbitan tristearate (g) | 50 | 0 | 0 | 4.8 | 9.1 | 0 | 0 |
| | Polyoxy-ethylene sorbitan trioleate (g) | 0 | 50.0 | 0 | 0 | 0 | 0 | 0 |
| | Tetra-ethoxy sorbitan monostearate (g) | 0 | 0 | 0.8 | 0 | 0 | 0 | 0 |
| | Polyoxy-ethylene sorbitan monostearate (g) | 1.1 | 0 | 0 | 0 | 0 | 0 | 0 |
| | Polyoxy-ethylene(4) sorbitan monostearate (g) | 0 | 0 | 0 | 0 | 0 | 0.12 | 0.24 |
| Component (c) | Laurylamine (g) | 0 | 0 | 0 | 0.36 | 0.04 | 0 | 0 |
| | MPEG 750 (g) | 0 | 0 | 4.5 | 0 | 0 | 0 | 0 |

TABLE 13

Performance Data of Examples 63 to 69

| | Cotton | | | | Polyester | |
|---|---|---|---|---|---|---|
| | Water Drop | Corn Oil | Mineral Oil | Spray | Water Drop | Spray |
| Ex. 63 | 0 | 4 | 3 | 0 | — | — |
| Ex. 64 | 0 | 3.5 | 3 | 0 | — | — |
| Ex. 65 | 0 | — | — | 25 | — | — |
| Ex. 66 | 3 | — | — | 70 | 3 | 50 |
| Ex. 67 | 3 | — | — | 70 | 3 | 50 |
| Ex. 68 | 3 | — | — | 70 | 3 | 90 |
| Ex. 69 | 3 | — | — | 90 | 3 | 100 |

EXAMPLES 70 TO 94

Examples 70 to 94 follow the procedures of Examples 1 (compounds) and Example 2 (dispersions), using an isocyanate, a compound of Formula (Ia), at least one alcohol reagent, and up to one additional reagent as described in Table 14. The alcohol reagent and additional reagents were added to the reaction after the initial compound of Formula (Ia) and isocyanate had reacted for 1 hour, and the reaction mixture was heated at 80° C. for an additional four hours. In Examples 88 to 91, sodium carbonate (0.5% by total reagent weight) was combined with the sorbitan tristearate before reaction. Examples 70 to 94 were applied as dispersions to textiles at 60 g/L, and tested according to the test methods described above.

EXAMPLE 95

Example 95 follows the procedure of Example 65, using DESMODUR N-100 isocyanate, sorbitan tristearate, and PRIPOL 2033 as described in Table 14. The PRIPOL 2033 was added to the reaction after the initial compound of Formula (Ia) and isocyanate had reacted for 6 hours, and the reaction mixture was heated at 80° C. overnight. Example 93 was applied as dispersions to textiles at 60 g/L, and tested according to the test methods described above.

TABLE 14

Compositions of Examples 70 to 95

| Ex | (a) Desmodur N100 (g) | (b) Desmodur H (g) | Sorbitan Tristearate (g) | (c) Compound | Amt (g) | Compound | Amt (g) |
|---|---|---|---|---|---|---|---|
| 70 | 24.6 | 0 | 50.0 | MPEG 750 | 46.5 | 1,3-propanediol | 0.8 |
| 71 | 24.6 | 0 | 50.0 | MPEG 750 | 46.5 | SILMER OH Di-10 | 10.6 |
| 72 | 24.6 | 0 | 50.0 | MPEG 750 | 46.5 | SILMER NH Di-8 | 9.9 |
| 73 | 24.6 | 0 | 50.0 | MPEG 750 | 46.5 | triethylene glycol | 1.6 |
| 74 | 24.6 | 0 | 50.0 | MPEG 750 | 46.5 | polypropylene glycol | 2.3 |
| 75 | 24.6 | 0 | 50.0 | MPEG 750 | 46.5 | PRIPOL 2033 | 2.9 |
| 76 | 24.6 | 0 | 50.0 | MPEG 750 | 46.5 | PRIAMINE 1075 | 5.6 |
| 77 | 24.6 | 0 | 50.0 | MPEG 750 | 46.5 | PLURONICS F68 | 88.7 |
| 78 | 24.6 | 0 | 50.0 | MPEG 750 | 46.5 | PLURONICS L35 | 20.1 |
| 79 | 24.6 | 0 | 50.0 | MPEG 750 | 46.5 | 12-hydroxystearic acid | 4.0 |
| 80 | 24.6 | 0 | 50.0 | MPEG 750 | 46.5 | decaglycerol | 8.0 |
| 81 | 24.6 | 0 | 50.0 | MPEG 750 | 46.5 | poly(tetrahydrofuran) 250 | 2.6 |
| 82 | 24.6 | 0 | 50.0 | MPEG 750 | 46.5 | poly(tetrahydrofuran) 650 | 6.7 |
| 83 | 30.0 | 0 | 113.4 | t-butanol | 1.66 | — | — |
| 84 | 30.0 | 0 | 113.4 | water | 0.4 | — | — |
| 85 | 30.1 | 0 | 102.12 | water | 1.71 | | |
| 86 | 15.0 | 0 | 47.68 | t-butanol | 0.32 | | |
| 87 | 0 | 10.1 | 78.63 | water | 0.91 | | |
| 88 | 25.1 | 0 | 99.80 | n-butanol | 0.50 | | |
| 89 | 25.1 | 0 | 100.33 | water | 0.72 | | |
| 90 | 15.5 | 0 | 57.41 | n-butanol | 0.31 | | |
| 91 | 15.0 | 0 | 55.48 | PRIPLAS T 3293 | 3.87 | | |
| 92 | 15.0 | 0 | 55.75 | n-butanol | 0.285 | | |
| 93 | 15.0 | 0 | 105.5 | n-butanol | 0.285 | | |
| 94 | 15.0 | 0 | 52.05 | n-butanol | 0.285 | | |
| 95 | 1.5 | 0 | 5.6 | PRIPOL 2033 | 0.06 | | |

TABLE 15

Performance Data of Examples 70 to 95

| | Cotton | | | Polyester | |
|---|---|---|---|---|---|
| | Water Drop | Corn Oil | Mineral Oil | Water Drop | Spray |
| Ex. 70 | 2 | 4.5 | 4.5 | — | — |
| Ex. 71 | 2 | 4.5 | 4.5 | — | — |
| Ex. 72 | 2 | 3.5 | 3 | — | — |
| Ex. 73 | 2 | 4 | 3 | — | — |
| Ex. 74 | 2 | 4.5 | 4 | — | — |
| Ex. 75 | 2 | 4 | 3 | — | — |
| Ex. 76 | 2 | 4 | 3 | — | — |
| Ex. 77 | 2 | 3.5 | 3 | — | — |
| Ex. 78 | 2 | 3.5 | 3 | — | — |
| Ex. 79 | 2 | 4 | 3.5 | — | — |
| Ex. 80 | 2 | 3.5 | 3 | — | — |
| Ex. 81 | 2 | 4 | 3 | — | — |
| Ex. 82 | 2 | 4.5 | 4 | — | — |
| Ex. 83 | 3 | — | — | 100 | 3 | 90 |
| Ex. 84 | 3 | — | — | 100 | 3 | 100 |
| Ex. 85 | 3 | — | — | 100 | 3 | 100 |
| Ex. 86 | 4 | — | — | 100 | 4 | 90 |
| Ex. 87 | 3 | — | — | 75 | 3 | 70 |
| Ex. 88 | 3 | — | — | 100 | 3 | 100 |
| Ex. 89 | 3 | — | — | 100 | 3 | 100 |
| Ex. 90 | 3 | — | — | 100 | | |
| Ex. 91 | 3 | — | — | 95 | 3 | 95 |
| Ex. 92 | 3 | — | — | 100 | 3 | 90 |
| Ex. 93 | 3 | — | — | 100 | 3 | 100 |
| Ex. 94 | 4 | — | — | 100 | 3 | 100 |
| Ex. 95 | 3 | — | — | 90 | 3 | 90 |

EXAMPLES 96 TO 102 AND 108 TO 110

Examples 96 to 102 and 108 to 110 follow the procedures of Examples 1 (compounds) and Example 2 (dispersions), using DESMODUR N-100 isocyanate, one or more compounds of Formula (Ia) or Formula (Ib), and at least one additional reagent as described in Table 16. The additional reagents were added to the reaction after the initial compound of Formula (Ia) and (Ib) and isocyanate had reacted for 1 hour, and the reaction mixture was heated at 80° C. for an additional four hours. Examples 96 to 102 and 108 to 110 were applied as dispersions to textiles at 60 g/L, and tested according to the test methods described above.

EXAMPLES 103 TO 107

Example 103 to 107 follow the procedure of Example 65, using DESMODUR N-100 isocyanate, one or more compounds of Formula (Ia) or Formula (Ib), and at least one additional reagent as described in Table 16. The additional reagents were added to the reaction after the initial compound of Formula (Ia) and (Ib) and isocyanate had reacted for 6 hours, and the reaction mixture was heated at 80° C. overnight. In Example 105, sodium carbonate (0.07 g) was combined with the sorbitan tristearate and sorbitan citrate before the isocyanate addition. Examples 103 to 104 and 106 to 107 were applied as dispersions to textiles at 60 g/L (Example 105 was applied at 100 g/L), and tested according to the test methods described above.

TABLE 16

Compositions of Examples 96 to 110

| Ex. | Component (a) Desmodur N100 (g) | Component (b) Compound(s) | Amt(s) (g) | Component (c) Compound | Amt (g) |
|---|---|---|---|---|---|
| 96 | 30.0 | Sorbitan tribehenin 40/sorbitan monostearate | 123.66/1.25 | | |
| 97 | 15.0 | Sorbitan tribehenin 50 | 62.5 | n-butanol | 0.285 |
| 98 | 15.0 | Sorbitan tribehenin 88 | 69.1 | n-butanol | 0.285 |
| 99 | 15.0 | Sorbitan tribehenin 40 | 66.3 | n-butanol | 0.285 |
| 100 | 15.0 | Dipentaerythritol esters | 68.05 | n-butanol | 0.855 |
| 101 | 15.0 | Sorbitan tristearate, low OH value | 171.1 | n-butanol | 0.855 |
| 102 | 15.0 | Sorbitan ester - lauric acid | 145.9 | n-butanol | 0.855 |
| 103 | 1.5 | Tri(2-octyldodecyl) citrate | 7.54 | Hexyl-amine | 0.02 |
| 104 | 1.5 | Tri(2-octyldodecyl) citrate | 4.0 | Hexyl-amine | 0.2 |
| 105 | 1.5 | Sorbitan tristearate/trioctyldodecyl citrate | 2.75/3.81 | n-butanol | 0.11 |
| 106 | 1.5 | Trioctadecyl citrate | 6.9 | stearyl mercaptan | 0.11 |
| 107 | 1.5 | Trioctadecyl citrate | 3.65 | stearyl mercaptan | 1.1 |
| 108 | 12.0 | Sorbitan tribehenin 50 | 26.5 | MPEG 750 | 23.6 |
| 109 | 12.1 | Sorbitan tribehenin 88 | 29.6 | MPEG 750 | 23.8 |
| 110 | 12.4 | Sorbitan tribehenin 40 | 29.0 | MPEG 750 | 24.3 |

TABLE 17

Performance Data of Examples 96 to 110

| | Cotton | | | | Polyester | |
|---|---|---|---|---|---|---|
| | Water Drop | Corn Oil | Mineral Oil | Spray | Water Drop | Spray |
| Ex. 96 | 3 | — | — | 80 | 3 | 100 |
| Ex. 97 | 3 | — | — | 100 | 3 | 90 |
| Ex. 98 | 3 | — | — | 100 | 3 | 85 |
| Ex. 99 | 3 | — | — | 100 | 3 | 100 |
| Ex. 100 | 3 | — | — | 100 | 3 | 95 |
| Ex. 101 | 3 | — | — | 60 | 3 | 100 |
| Ex. 102 | 3 | — | — | 60 | 2 | 50 |
| Ex. 103 | 3 | — | — | 70 | 3 | 50 |
| Ex. 104 | 3 | — | — | 70 | 3 | 50 |
| Ex. 105 | 3 | — | — | 80 | 3 | 60 |
| Ex. 106 | 3 | — | — | 100 | 3 | 100 |
| Ex. 107 | 3 | — | — | 80 | 3 | 100 |
| Ex. 108 | 4 | 3 | 2 | 75 | — | — |
| Ex. 109 | 4 | 3 | 1 | 80 | — | — |
| Ex. 110 | 4 | 3 | 1 | 75 | — | — |

EXAMPLES 111 TO 114

Examples 111 to 114 follow the procedures of Examples 1 (compounds) and Example 2 (dispersions), using DESMODUR N-100 isocyanate, one or more compounds of Formula (Ia), and at least one additional reagent as described in Table 18. The additional reagents were added to the reaction after the initial compound of Formula (Ia) and isocyanate had reacted for 1 hour, and the reaction mixture was heated at 80° C. for an additional four hours. Examples 111 to 114 were applied as dispersions to textiles at 60 g/L, and tested according to the test methods described above.

EXAMPLES 115 TO 117

Examples 115 to 117 follow the procedure of Example 65, using DESMODUR N-100 isocyanate, one or more compounds of Formula (Ia), and at least one additional reagent as described in Table 18. The additional reagents were added to the reaction after the initial compound of Formula (Ia) and isocyanate had reacted for 6 hours, and the reaction mixture was heated at 80° C. overnight. Examples 115 to 117 were applied as dispersions to textiles at 60 g/L, and tested according to the test methods described above.

TABLE 18

Compositions of Examples 111 to 117

| | Component (a) | Component (b) | | Component (c) | |
|---|---|---|---|---|---|
| Ex. | Desmodur N100 (g) | Sorbitan tri-stearate (g) | Sorbitan mono-stearate (g) | Compound | Amt(s) (g) |
| 111 | 30.0 | 108.29 | | betaine HCl | 1.21 |
| 112 | 30.49 | 73.24 | 1.4 | stearyl alcohol | 13.49 |
| 113 | 30.11 | 102.59 | | betaine HCl | 2.41 |
| 114 | 30.25 | 100.19 | | butanone oxime | 0.75 |
| 115 | 1.9 | 5.6 | 0 | N,N-dimethylaminoethanol | 0.04 |
| 116 | 1.5 | 5.98 | | diisopropylamine | 0.04 |
| 117 | 1.5 | 3.15 | | diisopropylamine | 0.4 |

TABLE 19

Performance Data of Examples 111 to 117

|  | Cotton | | Polyester | |
|---|---|---|---|---|
|  | Water Drop | Spray | Water Drop | Spray |
| Ex. 111 | 3 | 85 | 3 | 100 |
| Ex. 112 | 3 | 80 | 3 | 100 |
| Ex. 113 | 3 | 85 | 3 | 100 |
| Ex. 114 | 4 | 90 | 4 | 90 |
| Ex. 115 | 3 | 100 | 3 | 100 |
| Ex. 116 | 3 | 75 | 3 | 90 |
| Ex. 117 | 3 | 85 | 3 | 85 |

EXAMPLE 118

Example 118 follows the procedures of Examples 1 (compounds) and Example 2 (dispersions), reacting DESMODUR N-100 isocyanate with sorbitan tristearate according to Table 20, and incorporating sodium carbonate as a co-catalyst (0.375 g) during reaction. Example 118 was applied as dispersions to textiles at 60 g/L, and tested according to the test methods described above.

EXAMPLES 119 AND 120

Examples 119 and 120 follow the procedure of Example 65, using DESMODUR N-100 isocyanate, sorbitan tristearate, and lauric acid as described in Table 20. The lauric acid was added to the reaction after the initial compound of Formula (Ia) and isocyanate had reacted for 6 hours, and the reaction mixture was heated at 80° C. overnight. Examples 119 and 120 were applied as dispersions to textiles at 100 g/L, and tested according to the test methods described above.

TABLE 20

Compositions of Examples 118 to 120

| | Component. (a) | Component (b) | | Component (c) |
|---|---|---|---|---|
| | Desmodur N100 (g) | Compound | Amount (g) | Lauric acid (g) |
| Ex. 118 | 15.0 | sorbitan tristearate | 59.87 | |
| Ex. 119 | 1.5 | sorbitan tristearate | 5.68 | 0.08 |
| Ex. 120 | 2.2 | sorbitan tristearate | 5.95 | 0.68 |

TABLE 21

Performance Data of Examples 118 to 120

|  | Cotton | | Polyester | |
|---|---|---|---|---|
|  | Water Drop | Spray | Water Drop | Spray |
| Ex. 118 | 3 | 100 | 3 | 100 |
| Ex. 119 | 3 | 80 | 3 | 90 |
| Ex. 120 | 2 | 70 | 2 | 90 |

EXAMPLES 121 TO 124

Examples 121 to 124 follow the procedure of Example 65, using DESMODUR N-100 isocyanate, sorbitan tristearate, and an additional reagent as described in Table 22. The additional reagent was added to the reaction after the sorbitan tristearate and isocyanate had reacted for 6 hours, and the reaction mixture was heated at 80° C. overnight. Examples 121 to 124 were applied as dispersions to textiles at 60 g/L, and tested according to the test methods described above.

TABLE 22

Compositions of Examples 121 to 124

| | Component (a) | Component (b) | Component (c) | |
|---|---|---|---|---|
| | Desmodur N100 (g) | sorbitan tristearate (g) | dodecane mercaptan (g) | 3-mercapto-propionic acid (g) |
| Ex. 121 | 1.5 | 6.0 | 0.08 | 0 |
| Ex. 122 | 1.5 | 3.2 | 0.78 | 0 |
| Ex. 123 | 1.5 | 6.0 | 0 | 0.05 |
| Ex. 124 | 1.5 | 3.2 | 0 | 0.41 |

TABLE 23

Performance Data of Examples 122 to 125

|  | Cotton | | Polyester | |
|---|---|---|---|---|
|  | Water Drop | Spray | Water Drop | Spray |
| Ex. 121 | 3 | 90 | 3 | 100 |
| Ex. 122 | 3 | 80 | 3 | 85 |
| Ex. 123 | 4 | 75 | 3 | 100 |
| Ex. 124 | 4 | 85 | 3 | 90 |

EXAMPLES 125 TO 131

Examples 125 to 131 follow the procedure of Example 65, using DESMODUR N-100 isocyanate, sorbitan tristearate, and an additional reagent as described in Table 24. The additional reagent was added to the reaction after the sorbitan tristearate and isocyanate had reacted for 6 hours, and the reaction mixture was heated at 80° C. overnight. For examples 130 to 132, sodium carbonate (0.075 g) was included during the reaction of isocyanate and sorbitan tristearate. Examples 125 to 131 were applied as dispersions to textiles at 60 g/L (Examples 125 to 128) or 100 g/L (Examples 129 to 131), and tested according to the test methods described above.

EXAMPLE 132

Example 132 follows the procedures of Examples 1 (compounds) and Example 2 (dispersions), using DESMODUR N-3300 isocyanate, two compounds of Formula (Ia), and a C18 diglyceride as described in Table 24. The C18 diglyceride and sorbitan monostearate were added to the reaction after the initial compound of Formula (Ia) and isocyanate had reacted for 1 hour, and the reaction mixture was heated at 80° C. for an additional four hours. Example 132 were applied as dispersions to textiles at 60 g/L, and tested according to the test methods described above.

TABLE 24

Compositions of Examples 125 to 132

| | Component (a) | | Component (b) | | Component (c) | |
|---|---|---|---|---|---|---|
| | Desmodur | Desmodur | | | | |
| Ex. | N100 (g) | N3300 (g) | Compound(s) | Amt(s) (g) | Compound | Amt (g) |
| 125 | 1.5 | 0 | sorbitan trisearate | 6.0 | triglycerol monostearate | 0.05 |
| 126 | 1.5 | 0 | sorbitan trisearate | 3.15 | triglycerol monostearate | 0.5 |
| 127 | 1.5 | 0 | sorbitan trisearate | 6.0 | Hexaglycerol distearate | 0.07 |
| 128 | 1.5 | 0 | sorbitan trisearate | 3.15 | Hexaglycerol distearate | 0.65 |
| 129 | 1.5 | 0 | sorbitan tristearate | 5.55 | decaglyceryl mono(caprylate/caprate) | 0.38 |
| 130 | 1.6 | 0 | sorbitan tristearate | 4.67 | decaglyceryl mono(caprylate/caprate) | 1.58 |
| 131 | 1.5 | 0 | sorbitan tristearate | 5.56 | Polyglycerol-3 | 0.21 |
| 132 | 15.0 | 0 | sorbitan tristearate/sorbitan mono-stearate | 48.08/1.35 | Glycerol distearate | 12.69 |

TABLE 25

Performance Data of Examples 126 to 133

| | Cotton | | Polyester | |
|---|---|---|---|---|
| | Water Drop | Spray | Water Drop | Spray |
| Ex. 125 | 3 | 85 | 3 | 90 |
| Ex. 126 | 3 | 85 | 3 | 90 |
| Ex. 127 | 3 | 85 | 3 | 90 |
| Ex. 128 | 3 | 75 | 3 | 85 |
| Ex. 129 | 3 | 80 | 3 | 90 |
| Ex. 130 | 3 | 70 | 3 | 70 |
| Ex. 131 | 3 | 70 | 3 | 95 |
| Ex. 132 | 4 | 80 | 3 | 85 |

EXAMPLES 133-142

To a 40 mL scintillation vial, placed on a hotplate/stirrer and equipped with a nitrogen line and stir bar, substituted sugar alcohol according to the amount in Table 26, sodium carbonate (0.05 g), and MIBK (8.5 g) were added. The solution was stirred and heated to 55° C. for 10 minutes under nitrogen. DESMODUR N-100 (1.5 g) was added and the reaction temperature was increased to 80° C. A 0.5 wt. % Iron(III) chloride solution (in MIBK) was prepared and 0.1 g was added. The reaction temperature was increased to 95° C. After no less than 4 hours, n-butanol (0.1 g) was added, and the reaction temperature was decreased to 80° C. to stir overnight. Once the reaction mixture negative for active isocyanates, it was diluted in MIBK to 10 wt. % and tested according to the test methods above.

TABLE 26

Performance Data of Examples 133-142

| | Component (b) | | Cotton | | Polyester | |
|---|---|---|---|---|---|---|
| | Compound | Amt (g) | Water Drop | Spray | Water Drop | Spray |
| Ex. 133 | Myo-Inositol Laurate | 6.6 | 3 | 100 | 3 | 70 |
| Ex. 134 | Myo-Inositol Stearate | 5.1 | 3 | 100 | 3 | 100 |
| Ex. 135 | Mannitol behenin | 5.1 | 3 | 100 | 3 | 100 |
| Ex. 136 | Xylitol laurate | 5.1 | 0 | 50 | 0 | 0 |
| Ex. 137 | Xylitol behenin | 5.1 | 3 | 100 | 3 | 100 |
| Ex. 138 | Meso-erythritol laurate | 5.1 | 0 | 0 | 0 | 0 |
| Ex. 139 | Xylose laurate | 5.38 | 3 | 80 | 3 | 50 |
| Ex. 140 | Xylose palmitate | 5.1 | 3 | 100 | 3 | 100 |
| Ex. 141 | Glucose laurate | 10.8 | 3 | 80 | 3 | 80 |
| Ex. 142 | Glucose palmitate | 10.25 | 3 | 90 | 3 | 100 |

EXAMPLE 143

In a small vial, sorbitan tristearate (5.60 g), sodium carbonate (0.03 g), unfunctionalized colloidal silica (0.26 g, Nissan MIBK-ST Colloidal Silica, 10-15 nm diameter, 30% solids in MIBK) and excess MIBK (10.93 g) were heated to 55° C. under nitrogen. Once the temperature stabilized, DESMODUR N100 (1.50 g) was added and the temperature was increased to 80° C. After the temperature reached 80° C., catalyst was added and the temperature was increased to 95° C. The temperature was held at 95° C. for 4 hours prior to adding n-butanol (0.09 g) and DI water (0.02 g) and decreasing the temperature to 90° C. overnight. Upon testing negative for active isocyanates, the reaction was diluted to 10% solids in MIBK and tested according to the test methods above.

TABLE 27

Performance Data of Example 143

| | Cotton | | Polyester | |
|---|---|---|---|---|
| Example | Water Drop | Oil Drop | Water Drop | Oil Drop |
| 143 | 3 | 0 | 3 | 0 |

What is claimed is:

1. An aqueous composition comprising at least one hydrophobic compound having at least one linkage of Formula I:

—NHC(O)—X—     (I)

wherein the linkage of Formula (I) composes 30 to 100% by mol of the total urethane linkages in the hydrophobic compound;

X is the residue of a cyclic or acyclic sugar alcohol which is substituted with at least two —$R^1$; —$C(O)R^1$; —$(CH_2CH_2O)_n(CH(CH_3)CH_2O)_mC(O)R^1$; or mixtures thereof;

where the cyclic or acyclic sugar alcohol is selected from a saccharide, reduced sugar, aminosaccharide, aldonic acid, or aldonic acid lactone; wherein each n is independently 0 to 20;

each m is independently 0 to 20;

m+n is greater than 0; and each $R^1$ is independently a linear or branched alkyl group having 5 to 29 carbons.

2. The aqueous composition of claim 1, where X is 100% bio-based derived.

3. The aqueous composition of claim 1, where X is selected from Formulas (IIa), (IIb), or (IIc):

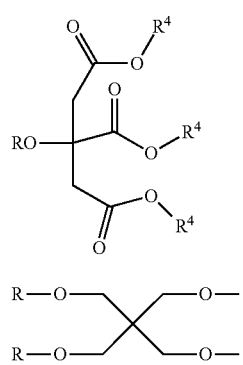

(IIa)

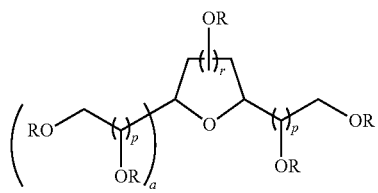

(IIb)

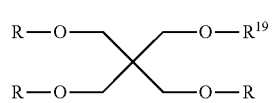

(IIc)

wherein each R is independently a direct bond to NHC(O) of Formula I; H; —$R^1$; —$C(O)R^1$; —$(CH_2CH_2O)_n(CH(CH_3)CH_2O)_mR^2$;

or —$(CH_2CH_2O)_n(CH(CH_3)CH_2O)_mC(O)R^1$;

each n is independently 0 to 20;

each m is independently 0 to 20;

m+n is greater than 0;

r is 1 to 3;

a is 0 or 1;

p is independently 0 to 2;

provided that a is 0 when r is 3;

each $R^1$ is independently a linear or branched alkyl group having 5 to 9 carbons optionally comprising at least 1 unsaturated bond;

each $R^2$ is independently H, or a linear or branched alkyl group having 6 to 30 carbons optionally comprising at least 1 unsaturated bond;

or a mixtures thereof, provided when X is Formula (IIa), then at least one R is a direct bond to NHC(O) of Formula 1; and at least one R is a —$R^1$; —$C(O)R^1$;

or —$(CH_2CH_2O)_n(CH(CH_3)CH_2O)_mC(O)R^1$;

each $R^4$ is independently a direct bond to NHC(O) of Formula I; —H, a linear or branched alkyl group having 6 to 30 carbons optionally comprising at least 1 unsaturated bond, or combinations thereof; —$(CH_2CH_2O)_n(CH(CH_3)CH_2O)_mR^2$;

or —$(CH_2CH_2O)_n(CH(CH_3)CH_2O)_mC(O)R^1$;

provided when X is Formula (IIb), then at least one R or $R^4$ is a direct bond to NHC(O) of Formula 1; and at least one R or $R^4$ is a linear or branched alkyl group optionally comprising at least 1 unsaturated bond, or combinations thereof;

or —$(CH_2CH_2O)_n(CH(CH_3)CH_2O)_mC(O)R^1$; and each $R^{19}$ is a direct bond to NHC(O) of Formula I; —H, —$C(O)R^1$, or —$CH_2C[CH_2OR]_3$, provided when X is Formula (IIc), then at least one $R^{19}$ or R is a direct bond to NHC(O) of Formula I; and at least one $R^{19}$ or R is —$C(O)R^1$, or —$(CH_2CH_2O)_n(CH(CH_3)CH_2O)_mC(O)R^1$.

4. The aqueous composition of claim 1, wherein the hydrophobic compound further comprises at least one moiety Q to form Formula (I'):

-Q-NHC(O)—X—     (I')

where Q is a monovalent, divalent, or polyvalent moiety selected from linear or branched, cyclic or acyclic, alkylene groups optionally containing at least one group selected from alkoxy, phenyl, siloxane, urethane, urea, biuret, uretdione, cyclized isocyanate, allophanate, or isocyanurate.

5. The aqueous composition of claim 4, wherein Q is selected from Formulas (IIIa), (IIIb), (IIIc) and (IIId):

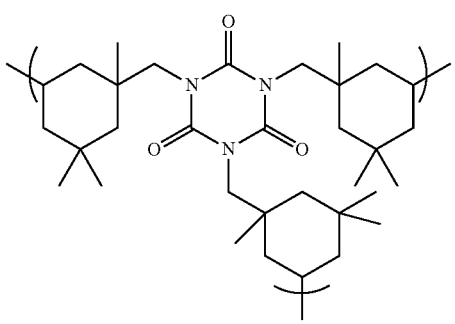

(IIIa)

-continued

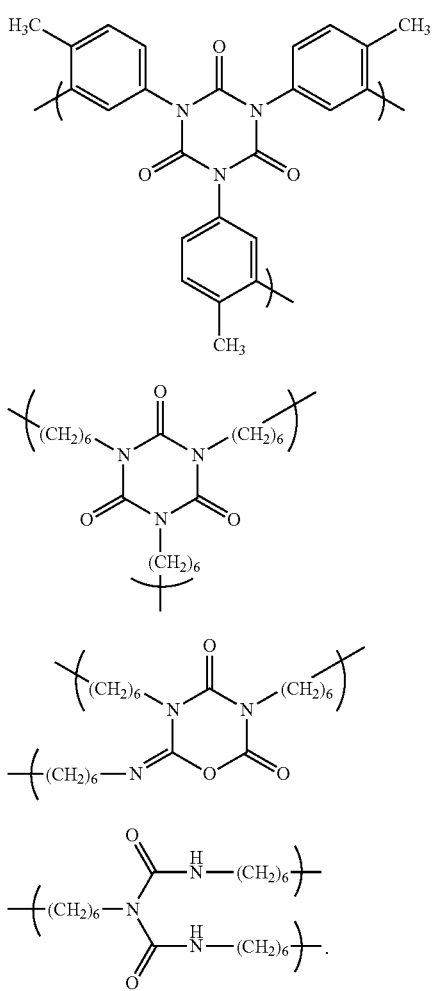

6. The aqueous composition of claim 1, wherein the hydrophobic compound further comprises at least one linkage selected from Formulas (IVa), (IVb), (IVc), or mixtures thereof:

$$R^6\text{-}D \quad \text{(IVa)},$$

$$R^{15}\text{—}(OCH_2CH(OR^{16})CH_2)_z\text{—}OR^{17} \quad \text{(IVb)},$$

$$\text{—NH—C(O)—NH—X} \quad \text{(IVc)}$$

wherein D is selected from —N(R12)-C(O)—NH—, —OC(O)NH—, —C(O)NH—, —SC(O)NH—, —O—(CH2CH2O)s(CH(CH3)CH2O)t-C(O)NH—, or —[C(O)]—O—(CH2CH2O)s(CH(CH3)CH2O)t-C(O)NH—;

X is defined as above;

R6 is selected from a —C1 to C30 linear or branched alkyl optionally comprising at least one unsaturated group, a hydroxy- or urethane-functional C1 to C30 linear or branched alkyl, a hydroxy- or urethane-functional linear or branched C1 to C30 polyether, a hydroxy- or urethane-functional linear or branched polyester having a polyester polymer backbone, a hydroxy- or urethane-functional linear or branched organosiloxane, an amine- or urea-functional linear or branched organosiloxane, a thiol- or thiocarbonate functional $C_1$ to $C_{30}$ linear or branched alkyl, an amine- or urea-functional $C_1$ to $C_{30}$ linear or branched alkyl,

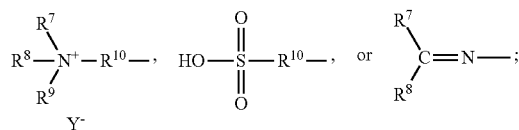

wherein $R^7$, $R^8$, and $R^9$ are each independently, —H, —$C_1$ to $C_6$ alkyl, or combinations thereof;

$R^{10}$ is a divalent alkyl group of 1 to 20 carbons;

$R^{12}$ is —H or a monovalent $C_1$ to $C_6$ alkyl group;

$R^{15}$, $R^{16}$, and $R^{17}$ are each independently a —H; —C(O)NH—, —$R^{18}$; —C(O)$R^{18}$ provided that at least one $R^{15}$, $R^{16}$, or $R^{17}$ is a —C(O)NH—;

$R^{18}$ is independently a linear or branched alkyl group having 5 to 29 carbons optionally comprising at least 1 unsaturated bond;

z is 1 to 15;

Y is Cl;

s is an integer of 0 to 50;

t is an integer of 0 to 50; and s+t is greater than 0.

7. The aqueous composition of claim 3 wherein X is selected from Formula (IIa) to be Formula (IIa'):

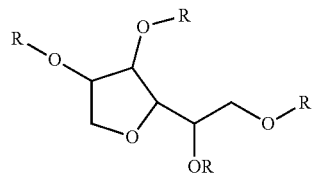

wherein the R variables not directly bonded to NHC(O) are further limited to independently —H; —$R^1$; or —C(O)$R^1$.

8. The aqueous composition of claim 3 wherein X is selected from Formula (IIa) to be Formula (IIa'):

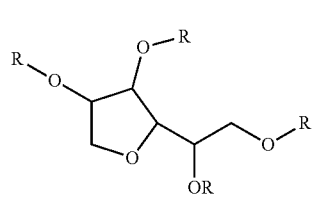

wherein the R variables not directly bonded to NHC(O) are further limited to independently —H; —$(CH_2CH_2O)_n(CH(CH_3)CH_2O)_mR^2$; or —$(CH_2CH_2O)_n(CH(CH_3)CH_2O)_mC(O)R^1$.

9. The aqueous composition of claim 1 wherein X is selected from Formula (IIb).

10. The aqueous composition of claim 1 wherein X is selected from Formula (IIc).

11. The aqueous composition of claim 6, wherein a linkage of Formula (IVa) is present, and D is —O—$(CH_2CH_2O)_s(CH(CH_3)CH_2O)_t$—C(O)NH—, or —[C(O)]—O—$(CH_2CH_2O)_s(CH(CH_3)CH_2O)_t$—C(O)NH—.

12. The aqueous composition of claim 6, wherein a linkage of Formula (IVa) is present, D is —N($R^{12}$)—C(O)—NH—, —OC(O)NH—, —C(O)NH—, or —SC(O)NH—; and $R^6$ is selected from a —$C_1$ to $C_{30}$ linear or branched alkyl optionally comprising at least one unsaturated group, a hydroxy- or urethane-functional $C_1$ to $C_{30}$ linear or branched alkyl, a hydroxy- or urethane-functional linear or branched $C_1$ to $C_{30}$ polyether, a hydroxy- or urethane-functional linear or branched polyester having a polyester polymer backbone, a hydroxy- or urethane-functional linear or branched organosiloxane, an amine- or urea-functional linear or branched organosiloxane, a thiol- or thiocarbonate functional $C_1$ to $C_{30}$ linear or branched alkyl, or an amine- or urea-functional $C_1$ to $C_{30}$ linear or branched alkyl.

13. The aqueous composition of claim 6, wherein a linkage of Formula (IVb) is present.

14. The aqueous composition of claim 1, further comprising inorganic oxide particles.

15. A method of treating a fibrous substrate comprising applying to the surface of the substrate an aqueous composition of claim 1.

16. The method of claim 15 wherein the contacting is by exhaustion, foam, flex-nip, nip, pad, kiss-roll, beck, skein, winch, liquid injection, overflow flood, roll, brush, roller, spray, dipping or immersion.

17. A fibrous substrate treated according to the method of claim 15.

18. The fibrous substrate of claim 17 which is a fiber, yarn, fabric, fabric blend, textile, spunlaced nonwoven, carpet, paper or leather of cotton, cellulose, wool, silk, rayon, nylon, aramid, acetate, acrylic, jute, sisal, sea grass, coir, polyamide, polyester, polyolefin, polyacrylonitrile, polypropylene, polyaramid, or blends thereof.

* * * * *